(12) United States Patent
Hashiba et al.

(10) Patent No.: US 8,986,210 B2
(45) Date of Patent: Mar. 24, 2015

(54) ULTRASOUND IMAGING APPARATUS

(75) Inventors: Kunio Hashiba, Tokyo (JP); Shinichiro Umemura, Sendai (JP); Hiroshi Masuzawa, Machida (JP); Satoshi Tamano, Kashiwa (JP)

(73) Assignees: Hitachi, Ltd., Tokyo (JP); Hitachi Medical Corporation, Tokyo (JP)

(*) Notice: Subject to any disclaimer, the term of this patent is extended or adjusted under 35 U.S.C. 154(b) by 404 days.

(21) Appl. No.: 13/524,387

(22) Filed: Jun. 15, 2012

(65) Prior Publication Data

US 2012/0253198 A1    Oct. 4, 2012

Related U.S. Application Data

(62) Division of application No. 11/917,787, filed as application No. PCT/JP2006/301404 on Jan. 30, 2006, now abandoned.

(30) Foreign Application Priority Data

Jun. 17, 2005  (JP) .................................. 2005-177131
Jun. 17, 2005  (JP) .................................. 2005-177133

(51) Int. Cl.
*A61B 8/14* (2006.01)
*G10K 11/34* (2006.01)
(Continued)

(52) U.S. Cl.
CPC ........... *G10K 11/346* (2013.01); *G01S 15/8925* (2013.01); *G01S 7/52095* (2013.01); *G01S 15/8927* (2013.01); *G01S 15/8993* (2013.01); *G01S 15/8922* (2013.01)
USPC ............................ 600/447; 600/437; 600/443

(58) Field of Classification Search
None
See application file for complete search history.

(56) References Cited

U.S. PATENT DOCUMENTS 4,307,613 A    12/1981  Fox
5,229,933 A    7/1993   Larson
(Continued)

FOREIGN PATENT DOCUMENTS

JP    06-237930    8/1994
JP    2961903      8/1999
(Continued)

OTHER PUBLICATIONS

U.S. Appl. No. 11/719,770, filed May 21, 2007, S. Umemura, et al.

*Primary Examiner* — Long V Le
*Assistant Examiner* — Bradley Impink
(74) *Attorney, Agent, or Firm* — Antonelli, Terry, Stout & Kraus, LLP.

(57) ABSTRACT

Ultrasound imaging apparatus including a two-dimensional array of plural transducer elements distributed two-dimensionally and transmits and receives ultrasonic waves while scanning an area to be imaged to create an ultrasound three-dimensional image. Transducer elements are divided into plural element blocks including a first element block of which a size in a second direction of an arrangement surface of the two-dimensional array is larger than a size in a first direction of the surface, and a second element block of which a size in the first direction is larger than a size in the second direction. Each of the element blocks is divided into a predetermined number of groups to form a transmit beam and plural receive beams in the area to be imaged. Further included is a selecting means for making transmit/receive channels of the transducer elements grouped to be one channel in each of the groups.

6 Claims, 32 Drawing Sheets

(51) Int. Cl.
*G01S 15/89* (2006.01)
*G01S 7/52* (2006.01)

(56) References Cited

U.S. PATENT DOCUMENTS

| | | |
|---|---|---|
| 6,676,602 B1 | 1/2004 | Barnes et al. |
| 6,736,779 B1 | 5/2004 | Sano et al. |
| 6,868,729 B2 | 3/2005 | Anemiya |
| 7,474,778 B2 | 1/2009 | Shinomura et al. |
| 2003/0018260 A1 | 1/2003 | Erikson |
| 2003/0163046 A1 | 8/2003 | Nohara et al. |
| 2004/0066708 A1 | 4/2004 | Ogawa |
| 2004/0267126 A1 | 12/2004 | Takeuchi |
| 2005/0228277 A1 | 10/2005 | Barnes et al. |
| 2005/0243812 A1 | 11/2005 | Phelps |

FOREIGN PATENT DOCUMENTS

| | | |
|---|---|---|
| JP | 2000-033087 | 2/2000 |
| JP | 2001-286467 | 10/2001 |
| JP | 2003-260055 | 9/2003 |
| JP | 2004-097379 | 4/2004 |
| JP | 2004-290509 | 10/2004 |

Fig.2
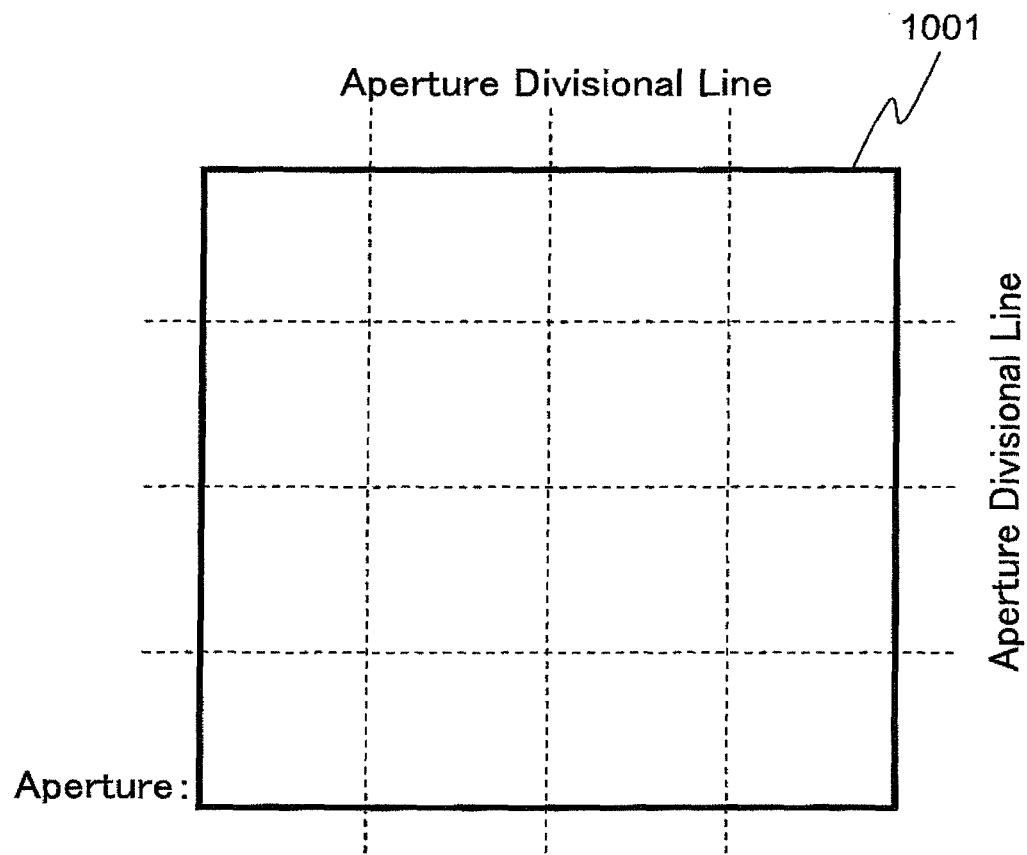
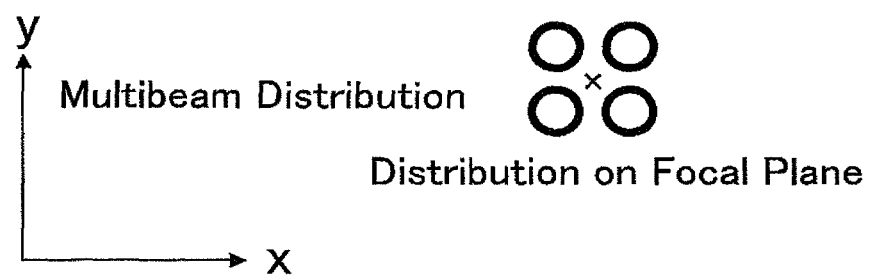

Azimuth Distance in Aperture Divisional Line ( mm and deg )

Azimuth Distance in Aperture Divisional Line ( mm and deg )

Fig.21A
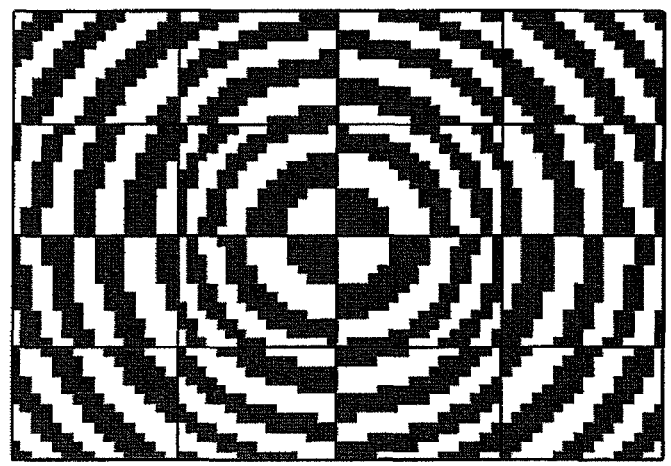
Fig.21B
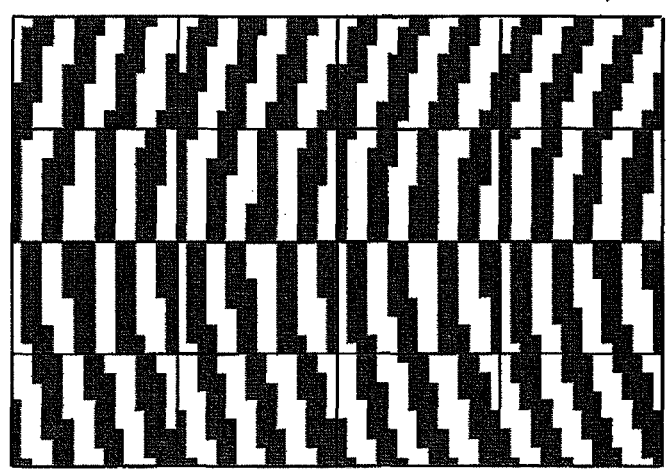

ULTRASOUND IMAGING APPARATUS

CROSS-REFERENCE TO RELATED APPLICATIONS

This is a divisional of U.S. application Ser. No. 11/917,787, filed Aug. 12, 2009, now abandoned which incorporated the disclosure of U.S. patent application Ser. No. 11/719,770, filed on May 21, 2007. This application relates to and claims priority from Japanese Patent Application Nos. 2005-177131 and 2005-177133, both filed on Jun. 17, 2005. The entirety of the contents and subject matter of all of the above is incorporated herein by reference.

TECHNICAL FIELD

The present invention relates to an ultrasound imaging apparatus and particularly to an ultrasound imaging apparatus having a two-dimensional array of electro-acoustic transducer elements (transducers) arranged two-dimensionally that, by the two-dimensional array, transmits and receives ultrasonic waves scanning an area to be imaged and produces an ultrasound three-dimensional image.

BACKGROUND ART

Ultrasonic diagnostic apparatuses utilizing a pulse-echo method that transmit pulsed ultrasonic waves to a living body and receive the reflected waves thus imaging the inside of the living body are widely used for medical diagnosis, as well as X-ray and MRI.

In order to achieve three-dimensional imaging for medical diagnosis with use of a two-dimensional array of ultrasound transducers, the number of signal lines led out from the transducers poses a problem. That is, because the two-dimensional array needs about $10^3$ to $10^4$ transducers in total, if a signal line is individually led out from every transducer, the number of the signal lines will be so great that the connection cable becomes too thick to handle.

In order to solve this problem, a method is disclosed in Japanese Patent Application Laid-Open Publication No. 2001-286467 (hereinafter called a reference 1), where switch circuitry is mounted on a two-dimensional array of ultrasound transducers, and elements forming the array are connected together as needed via the switch circuitry connecting to a cable, thereby reducing the number of cable cores led out by the order of one or two digits. The phase distribution at the plane reception surface of ultrasonic waves emitted from the focal position takes the form of concentric circles. Hence, in the reference 1, elements on the same circle of the concentric circles are connected together to the same cable core so as to lead out a signal. Further, because the pattern for connecting elements together needs to vary according to the beam formation direction, the connection pattern is changed using the switch circuitry.

In achieving three-dimensional imaging with use of a two-dimensional array of ultrasound transducers, another problem is with forming a plurality of beams simultaneously. High information-acquisition throughput is needed to acquire a large amount of image information necessary to form a three-dimensional image with utilizing high time resolution characteristic of the ultrasound imaging. Thus, the use of multiple beams for the simultaneous transmit/receive beam is indispensable. However, when using the element connection patterns of the reference 1 as they are, only one transmit/receive beam is formed corresponding to one pattern. Thus, this method is not suitable for high speed imaging.

Accordingly, a first object of the present invention is to provide an ultrasound imaging apparatus capable of simultaneously forming multiple beams suitable for high speed imaging at a low cost.

In order to realize the dynamic state of a dynamic part of an object three-dimensionally in real time by, for example, the observation of blood flow through a coronary artery of the heart and the measurement of systolic output, it was considered to obtain three-dimensional images in real time using an ultrasound probe comprising a two-dimensional array having electro-acoustic transducer elements arranged in a plane. However, because there was a conflicting relationship between the breadth of the field of view (the depth and viewing angle), the height of resolution, and the height of a frame rate (real-time capability), in order to improve an element, another element had to be sacrificed.

For example, assuming that the viewing angle is 60 degrees in both the lateral axis direction and elevational axis direction of the two-dimensional array and that the scan line interval is 1.5 degrees, then the number of scan lines per frame is 1,600. In order to obtain images of an object up to a depth of, e.g., 20 cm (the both-way distance for ultrasonic waves being 40 cm), scan time per scan line is at least about 260 μs because the speed of sound in usual parts of a living body is about 1,530 m/s. Thus, in this case, the frame cycle is about 0.4 sec and the frame rate is about 2.5 Hz, so that a frame rate of 20 to 30 Hz or greater, which is necessary for the observation of the cardiac dynamic state, could not be achieved.

Accordingly, in, e.g., Japanese Patent No. 2961903 (paragraphs 0008-0009, FIG. 3), an ultrasound three-dimensional imaging apparatus has been proposed which has a phase adjusting circuit that adjusts the phases of received signals output from a two-dimensional array of oscillators, which are divided into groups, to simultaneously form, e.g., four receive beams deflected at different small angles relative to a transmit direction.

Moreover, in Japanese Patent Application Laid-Open Publication No. 2000-33087 (paragraph 0090, FIG. 11), a phased array acoustic apparatus with in-group processors has been proposed where an array of 3,000 transducers is divided into 120 groups, or sub-arrays, each comprising 25 transducers and where an in-group processor delays and sums individual transducer signals and supplies the summed signal to one channel of a receive beam former.

Furthermore, in Japanese Patent Application Laid-Open Publication No. 2001-286467 (paragraph 0021, FIG. 3), an ultrasound diagnostic apparatus has been proposed where a delay corresponding to the distance to the focal point is given to each group of oscillators in a concentric annular area of a two-dimensional oscillator array such that ultrasonic waves emitted from each ring-like group of oscillators are converged on the focal point and that the ultrasonic waves reflected from the focal point are directed to the ring-like group of oscillators.

With a conventional ultrasound three-dimensional imaging apparatus, if four receive beams are formed simultaneously for one transmit beam, with the same breadth of the area to be imaged and the same resolution, a frame rate will quadruple. Hence, in the above example, in order to achieve a frame rate of 20 Hz or greater, eight or more ultrasound receive beams need to be formed for one ultrasound transmit beam.

However, in order to obtain images of sufficient resolution, a two-dimensional array of several thousand oscillators needs to be used. Accordingly, the conventional ultrasound imaging apparatus requires several thousand delay means and summing means, so that the size of a delay-and-sum circuit becomes huge. Thus, there is the problem that it is difficult to realize the apparatus as well as production costs being high. Further, if it is produced, the number of connection lines from the two-dimensional array of oscillators will be several thousand, resulting in imaging operation being actually impossible.

Generally, in order to obtain sufficient resolution, the aperture length of the two-dimensional array of oscillators needs to be made as large as possible to use a large number of electro-acoustic transducer elements. However, a receive beam former having several thousand input channels is unrealistic in terms of circuit size. Hence, it has been considered to reduce several thousand channels of electro-acoustic transducer elements to about 100 to 200 channels.

With the conventional phased array acoustic apparatus with in-group processors, because the number of channels is reduced, the circuit size is reduced and thus the improvement in operability can be expected. However, a grating lobe may occur depending on the shape of the sub-arrays of transducer elements. Thus, sufficient resolution and contrast may not be obtained, or noise or a false image may occur, so that desired image quality may not be obtained. Further, if more finely grouped, the number of channels increases and the circuit size increases, so that a desired frame rate may not be achieved.

Moreover, with the conventional ultrasound diagnostic apparatus, there are the following problems. Because the ring width of each ring-like group of oscillators is constant (a pitch of two elements), the intervals between the groups may be almost equal to the wavelength (the pitch of two elements) depending on the direction in which the ultrasound beam is directed, and thus a large grating lobe may occur and degrade image quality. If the intervals between the groups are decreased to suppress the occurrence of a grating lobe, the circuit size increases. Further, because the number of oscillators is extremely different between the inner ring and the outer ring, electrical characteristics such as impedance are greatly different for each ring. Thus, the size of circuitry for correction becomes large, or image quality is reduced. Or, if thinning the oscillators out so as to make the electrical characteristics the same for each ring, resolution will be reduced.

As such, in the case of reducing the number of channels of electro-acoustic transducer elements by grouping them, there is the problem that, because a conflicting relationship exists between reducing the number of channels and suppressing a grating lobe, as the number of channels is reduced, image quality is degraded.

Accordingly, a second object of the present invention is to solve the above problems and provide an ultrasound imaging apparatus that can produce ultrasound three-dimensional images with a broad field of view, high resolution, and a high frame rate at low cost.

DISCLOSURE OF THE INVENTION

To achieve the first objective, according to the present invention there is provided an ultrasound imaging apparatus in which a two-dimensional ultrasound transducer array having a plurality of transducer elements arranged two-dimensionally transmits pulse ultrasonic waves to an object, and each of the transducer elements receives a reflected wave of the pulse ultrasonic wave and which gives the received signal a delay corresponding to elapsed time from a time that each of the transducer elements transmitted to a time that the transducer element received so as to image the object. The plurality of transducer elements are divided into a plurality of blocks, and the delay is given to the received signal that has passed through selecting means for selecting from the transducer elements in each of the blocks.

The plurality of transducer elements arranged two-dimensionally are divided along concentric circles, and by giving the same delay to the elements in each divided concentric annular area, ultrasonic waves to converge on a focal point are generated. Each transducer element receives a reflected wave of the ultrasonic waves irradiated onto an object at the focal point. Then, by giving the received signal a delay corresponding to elapsed time from a time that each transducer element transmitted to a time that the transducer element received, the object is imaged. The plurality of transducer elements divided along concentric circles are divided into a plurality of blocks, and the selecting means connects the transducer elements in each concentric annular area part in each block so that delays are given to received signals on a per block basis. By this means, using a plurality of receive beams simultaneously formed corresponding to the divided blocks, the object can be imaged.

According to the present invention, there is provided an ultrasound imaging apparatus which can simultaneously form a plurality of beams suitable for high speed imaging at a low cost. In particular, because of connecting together transducer elements in each of equal phase areas in forming the plurality of beams, the number of cable cores leading out from the transducer elements is reduced.

To achieve the second object, according to the present invention there is provided an ultrasound imaging apparatus which has a two-dimensional array having a plurality of transducer elements arranged two-dimensionally and, by the two-dimensional array, transmits and receives ultrasonic waves scanning an area to be imaged to produce an ultrasonic three-dimensional image. The transducer elements are divided into a plurality of element blocks including a first element block of which a size in a second direction of an arrangement surface of the two-dimensional array is larger than a size in a first direction of the surface, and a second element block of which a size in the first direction is larger than a size in the second direction, and each of the element blocks is divided into a predetermined number of groups so as to form a transmit beam and a plurality of receive beams in the area to be imaged, the ultrasound imaging apparatus further comprising selecting means for making transmit/receive channels of the transducer elements in each of the groups converge so as to be reduced to one channel.

With the ultrasound imaging apparatus of the present invention, real-time ultrasound three-dimensional images with a broad field of view, high resolution, and a high frame rate can be produced at low cost.

BRIEF DESCRIPTION OF THE DRAWINGS

FIG. 2 shows a relationship between a distribution of multiple beams on a focal plane and aperture divisional lines;

FIG. 21 is a pattern diagram showing grouping as a comparative example;

BEST MODE FOR CARRYING OUT THE INVENTION

<First Embodiment>

Figure 1:
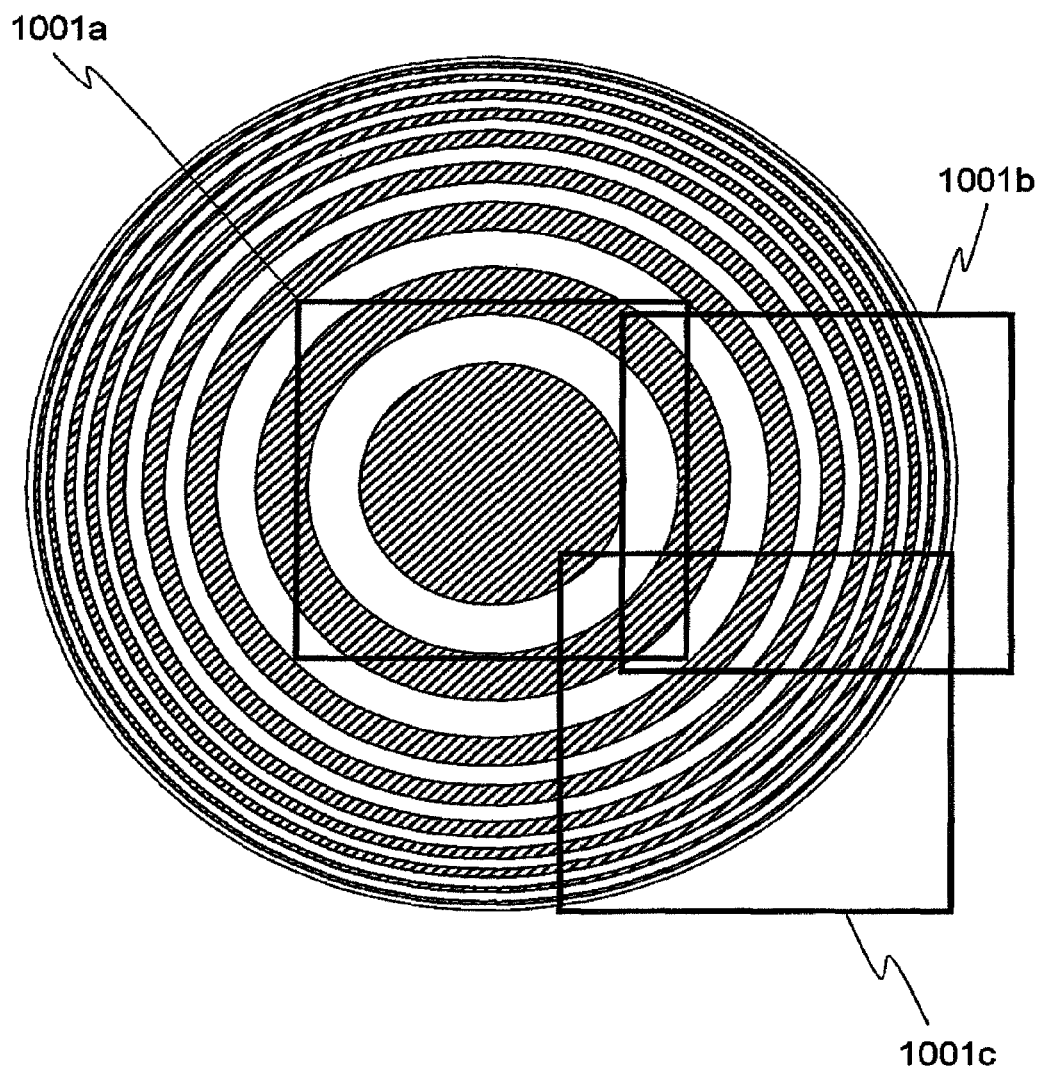
FIG. 1 shows a relationship between the position of a focal point relative to a transducer transmit/receive surface and a phase distribution on the transmit/receive surface.

A first embodiment of the present invention will be described below in detail with reference to FIGS. 1 to 13.

(Basic Principle)

The greatest advantage of an ultrasound diagnostic apparatus that other image diagnostic modalities such as X-ray and MRI do not have is that its imaging speed is so high as to enable real-time image display. That is, this imaging speed is such that the ultrasound diagnostic apparatus can update an image every about 30 ms, which is the time resolution of the human visual sense. Further, it is possible to even achieve time resolution with which to obtain an image every 15 ms for the diagnosis of the motion of a cardiac valve by slow speed reproduction.

Meanwhile, depth-wise (z direction) distance resolution from among spatial resolutions of a pulse echo method is determined by a time resolution required for an ultrasound pulse to travel to and back from a reflector. Because the propagation speed of ultrasonic waves in a living body is 1,500 m/s. This propagation speed is almost the same as in water, if the ultrasonic frequency is at or above several MHz, distance resolution of about 1 mm can be easily obtained from a time resolution of about 1 μs.

Spatial resolutions in directions (x, y directions) orthogonal thereto, i.e., azimuth resolutions are increased by focusing transmit waves or receive waves. In order to obtain azimuth resolutions of no greater than several times the ultrasonic wavelength, the focus needs to be so strong that the F number, which is the ratio of aperture to focal distance, becomes close to one. Thus, the depth of focus field corresponding to the depth of field for cameras becomes as small as several times the wavelength, which corresponds to about 1 μs in which an ultrasonic wave propagates both ways. Because of recent years' remarkable advance in high speed electronic circuit technology, reception focal distance can be changed while an ultrasonic wave propagates over this distance. This real-time reception dynamic focus technique enables always-focused imaging when receiving.

A living body is an existent occupying a three-dimensional space, and in observing the state of a disease developed therein through its images, essentially, three-dimensional observation should be performed if possible. In order to perform three-dimensional imaging while utilizing its high time resolution, which is an advantage of ultrasound imaging, and maintaining the high spatial resolution that has been achieved recently as described above, a two-dimensional ultrasound transducer array needs to be used to electronically scan along all the dimensions, because with a currently widely used method which mechanically scans a one-dimensional ultrasound transducer array (one-dimensional probe) along another dimension, it is difficult to move manually or mechanically the probe being in contact with the body surface of an object having irregular surfaces for three-dimensional measurement.

In achieving three-dimensional imaging for medical diagnosis using a two-dimensional ultrasound transducer array, there are at least two major problems. One is the problem with the number of signal lines led out from the ultrasound transducer array.

In order to freely form transmit and receive beams by the transducer array, the size in an arrangement direction of the elements forming the array needs to be equal to or smaller than about half the wavelength. This size is about 0.25 to 0.37 mm when an ultrasonic frequency of 2 to 3 MHz, usual in medical diagnosis, is used. Meanwhile, even a small-size transmit/receive aperture whose azimuth resolution is sacrificed somewhat to obtain an image of the heart between ribs is about 12 to 20 mm in width.

Accordingly, the two-dimensional array needs about $10^3$ to $10^4$ elements in total, and if all signal lines connected thereto are individually led out from the ultrasound transducers, the number of the signal lines will be great, resulting in the cable being thick and difficult to handle. In order to solve this problem by dealing with the cable, the cable smaller in outside diameter is needed. Accordingly, the cable cores whose thickness is already close to the limit of production technology need to be made even thinner, which is difficult to achieve. Further, the problem occurs that a large number of delay circuits need to be provided, which causes the capacitance of the ultrasound transducer to be smaller than the capacitance of the cable connected thereto, so that a received signal voltage is lowered.

Next, attention is paid to the phase distribution when ultrasonic waves emitted from a point reflector at the focal position reach a substantially planar transducer reception surface. The equal phase areas thereof form a concentric circular Fresnel distribution with the foot of the perpendicular line from the point reflector to the transducer reception surface as the center as shown in FIG. 1. Conversely, by transmitting with giving the same delay time to the elements in each concentric circular area, ultrasonic waves to converge on a focal point are generated. The pattern of connecting elements together changes according to the beam formation direction: 1001a when the focal point is right in front of the transducer reception surface, and 1001b or 1001c when in an oblique direction. Where multiple receive beams are formed, the equal phase areas that are formed by ultrasonic waves emitted from the point reflectors respectively at multiple focal points when reaching the transducer reception surface are slightly shifted from each other according to the shift amount in azimuth between the multiple focal points.

Thus, in order to form the multiple receive beams simultaneously, the transducer reception surface is divided into a number of blocks, and it is effective to lead out signal lines from each block using an equal phase area connection pattern that is average for the multiple focal points.

FIG. 2 shows a relationship between a distribution of multiple beams on a focal plane and aperture divisional lines. In the upper side of FIG. 2, aperture divisional lines dividing the aperture of the transducer reception surface into parts are represented by broken lines. The lower side of FIG. 2 shows the distribution of four receive beams on the focal plane, and the center position (indicated by "x"). In other words, the signal lines of the elements in each equal phase area are connected such that a focal point is formed at the center position of the multiple beams. Here, intervals between the four receive beams are very short compared with the size of the transducer reception surface.

Where forming four receive beams simultaneously, with use of FIG. 2, the relationship between their distribution on the focal plane and a reception surface division pattern optimal in forming them simultaneously can be examined. It is well known that there is a relationship between the sound field around the focal point on the focal plane and the sound field on the transmit/receive surface, where one is Fourier transformed into the other as with the relationship between an atom arrangement in a crystal and its X-ray diffraction pattern. Therefore, it is considered optimal to divide the reception aperture using the reciprocal lattice of the arrangement of multiple receive beams on the focal plane as divisional lines. Although in FIG. 2 four receive beams are located at the four vertexes of a square, if they form a rectangle with the length in the x direction longer than in the y direction, considering its reciprocal lattice, an optimum aperture division pattern can be obtained by making divisional line intervals in the y direction longer than in the x direction.

Figure 3:
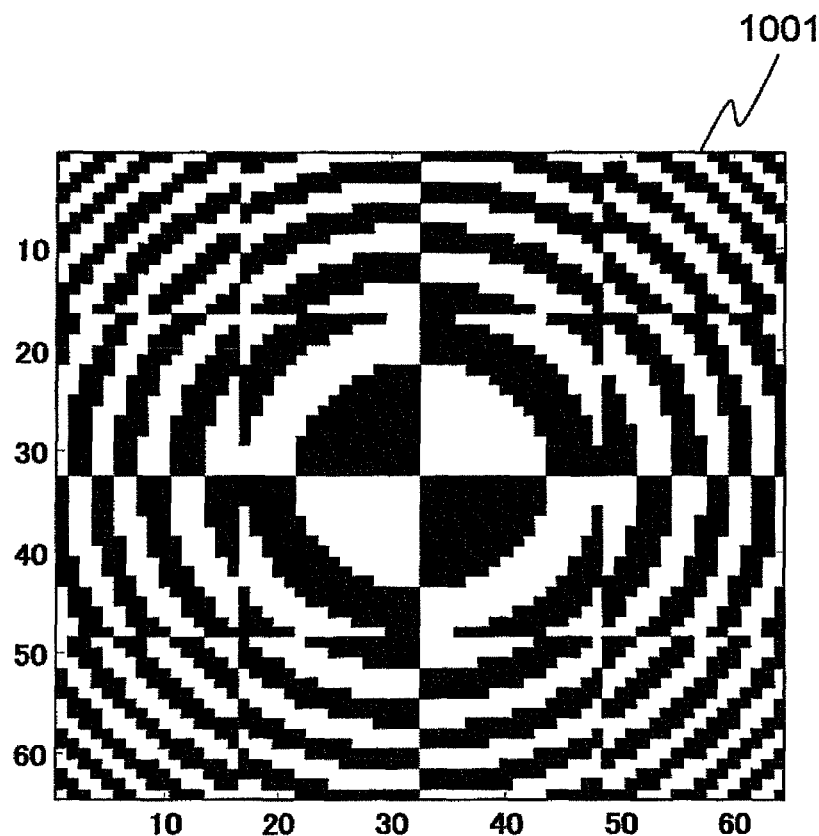
FIG. 3 shows an array element connection pattern to form focal points of multiple beams on a line perpendicular to the transducer reception surface.
Figure 4:
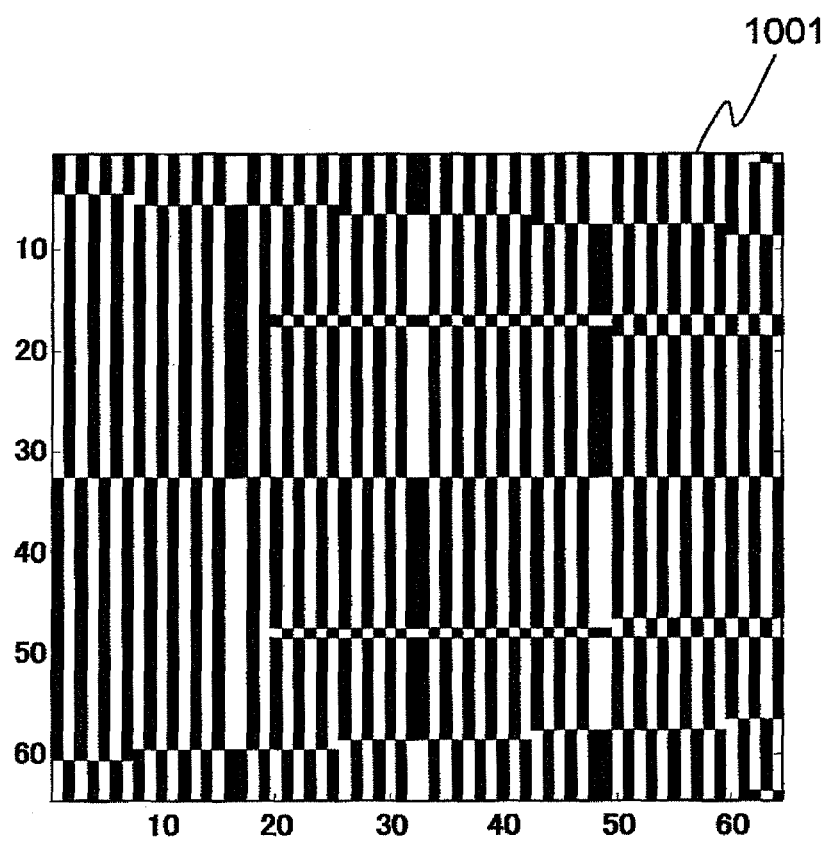
FIG. 4 shows an array element connection pattern to form focal points of multiple beams in an oblique direction relative to the line perpendicular to the transducer reception surface.
Figure 5:
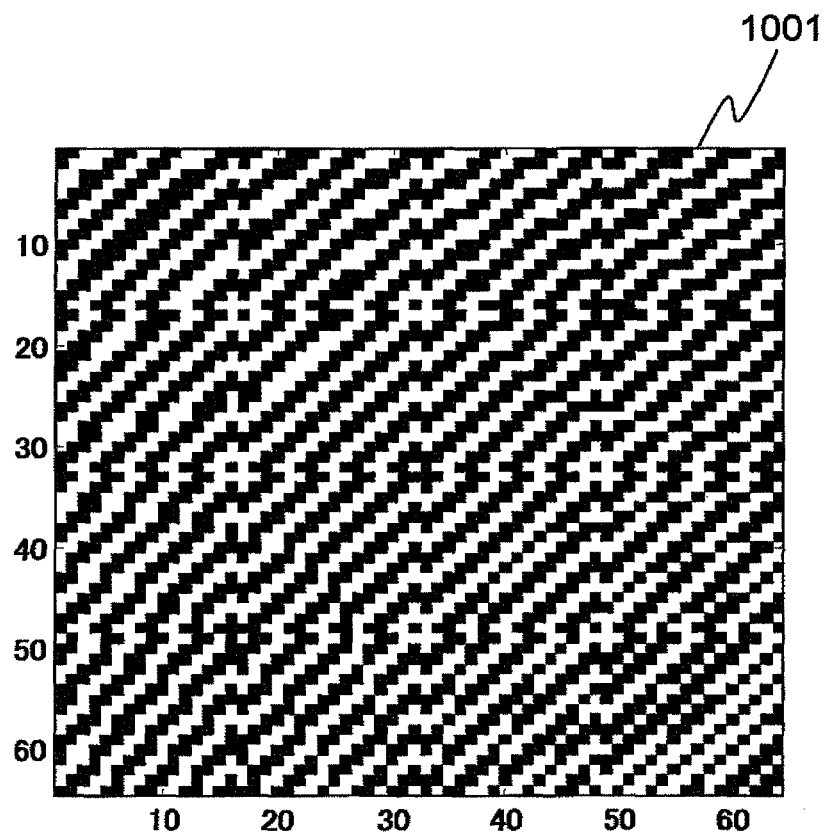
FIG. 5 shows an array element connection pattern to form focal points of multiple beams in an oblique direction relative to the line perpendicular to the transducer reception surface.

FIGS. 3 to 5 show schematically array element connection patterns obtained in this way for forming four receive beams simultaneously. In these examples, the entire reception aperture is divided into 4×4 blocks, and the elements in each block are connected according to the equal phase area connection pattern of a Fresnel distribution for forming the focal point at the center of the four receive beams (indicated by "x" in FIG. 2). In other words, the elements of each equal phase area are connected together such that the focal point is formed at the center position of multiple receive beams located at different positions on the focal plane. In the figures, each block is colored black or white such that adjacent blocks are opposite in color to each other. FIG. 3 shows the pattern for 1001a of FIG. 1 where the focal point is right in front of the transducer reception surface, and FIG. 4 shows the pattern for 1001b of FIG. 1 where the focal point is in an oblique direction relative to the transducer reception surface, in which pattern, stripes parallel to the y direction follow one after another in each block. FIG. 5 shows the pattern for 1001c of FIG. 1, in which stripes at an angle of 45 degrees to the x and y axes follow one after another in each block.

An ultrasound diagnostic apparatus (ultrasound imaging apparatus) according to an embodiment of the present invention will be described below with use of the figures.

Figure 6:
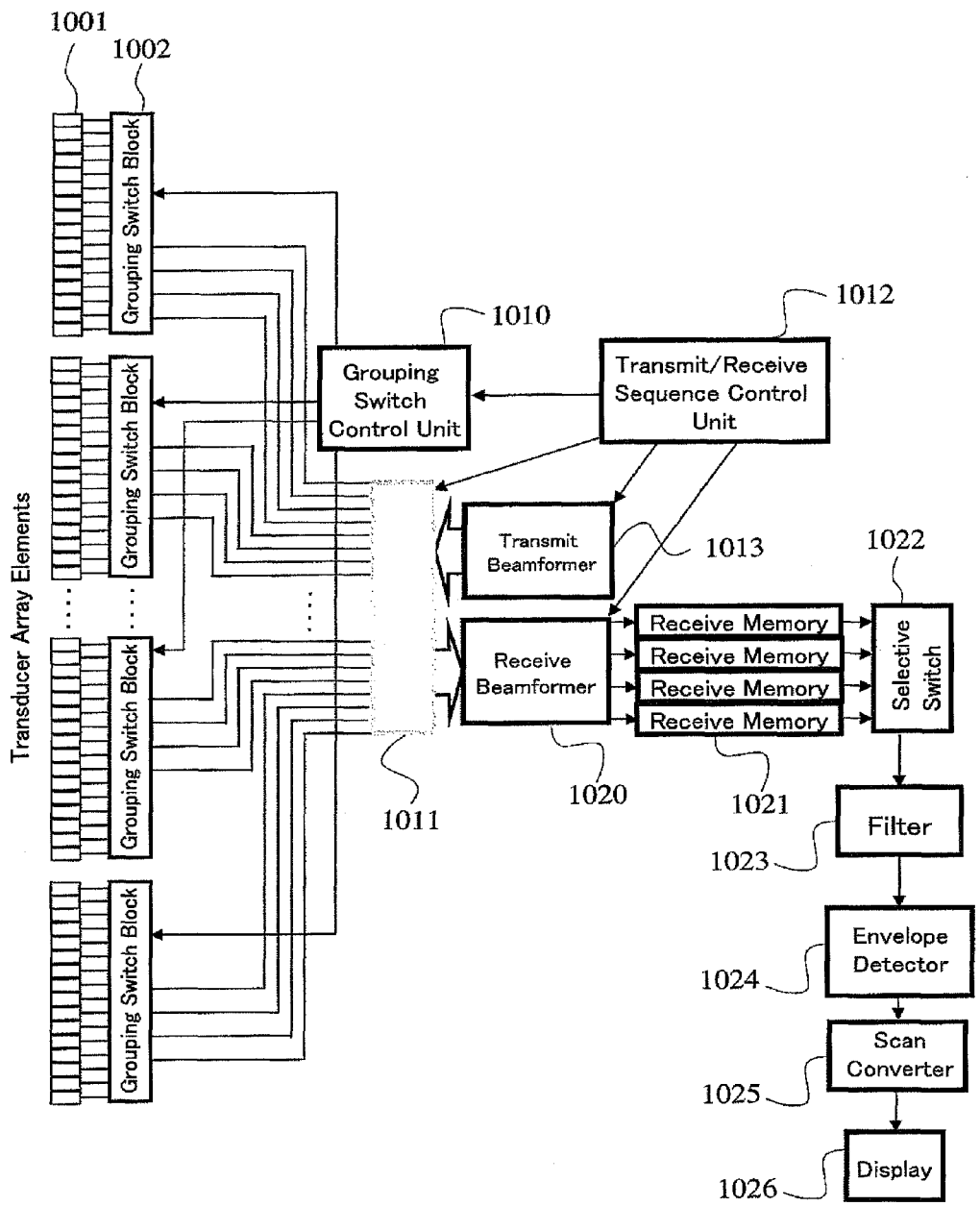
FIG. 6 is a block diagram showing the configuration of an ultrasound diagnostic apparatus of an embodiment.
Figure 7:
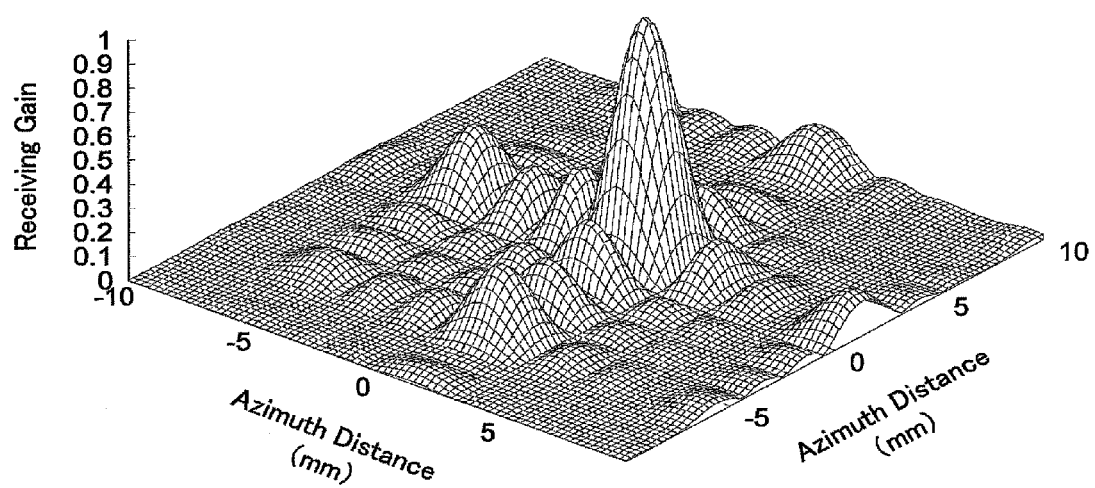
FIG. 7 shows distribution of a first receive beam on a focal plane when the focal point is shifted in azimuth.
Figure 8:
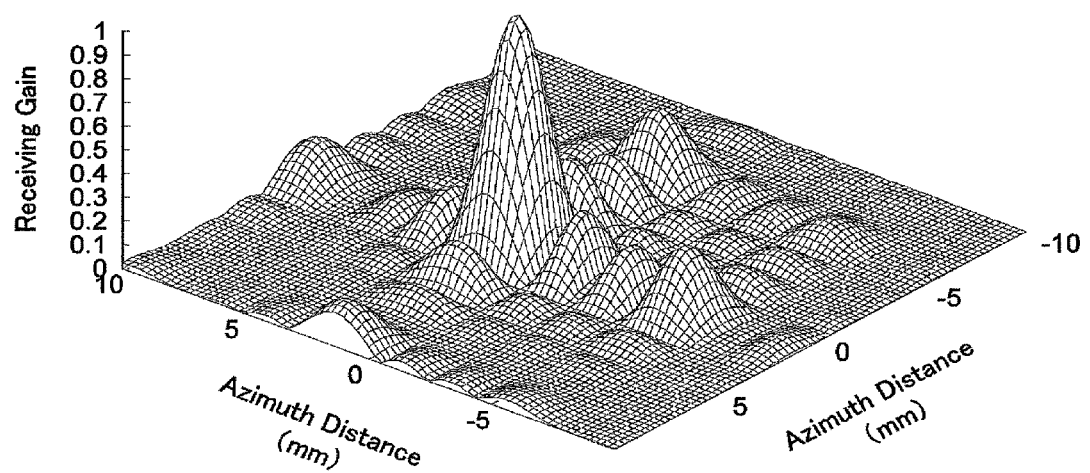
FIG. 8 shows distribution of a second receive beam on the focal plane when the focal point is shifted in azimuth.
Figure 9:
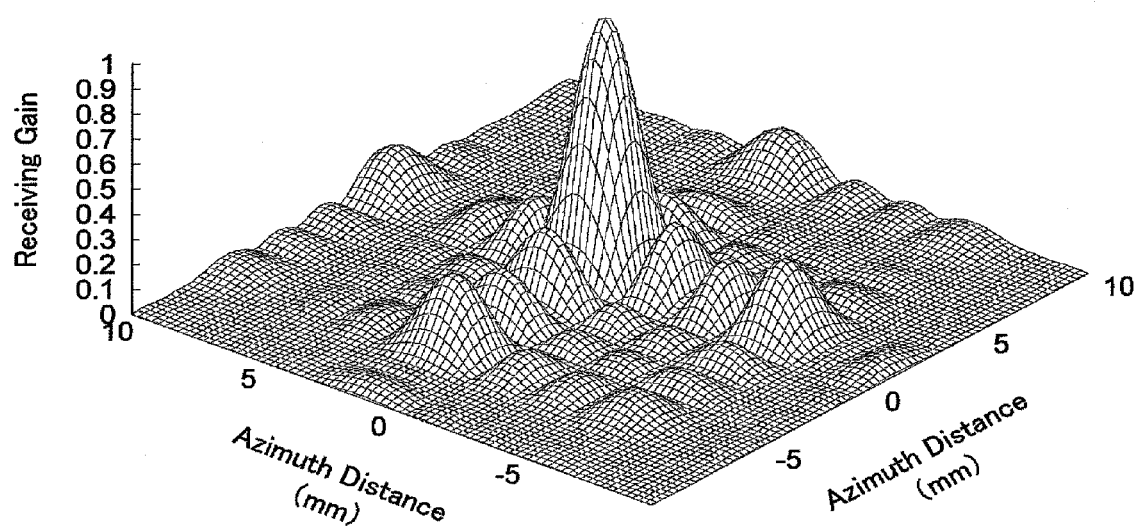
FIG. 9 shows distribution of a third receive beam on the focal plane when the focal point is shifted in azimuth.
Figure 10:
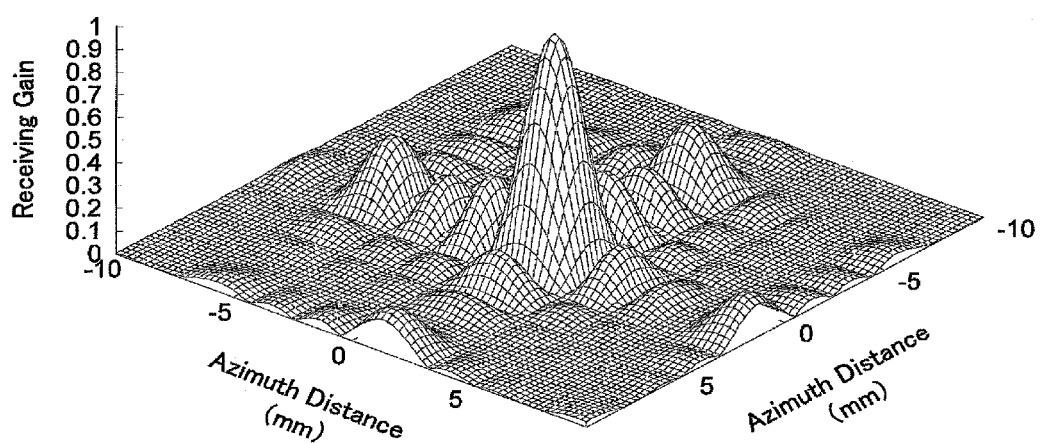
FIG. 10 shows distribution of a fourth receive beam on the focal plane when the focal point is shifted in azimuth.

FIG. 6 is a block diagram showing a typical configuration of an ultrasound diagnostic apparatus according to a pulse echo method. A transmit/receive sequence control unit 1012 controls a transmit beam former 1013, a receive beam former 1020, a selector 1011, and a grouping switch control unit 1010. The selector 1011 and the grouping switch control unit 1010 apply signals to control the connection pattern to grouping switch blocks 1002 that connect respectively to blocks of transducer array elements 1001 forming an ultrasound probe.

When transmitting ultrasonic waves, a single ultrasonic beam is formed instead of multiple beams. Accordingly, the grouping switch blocks 1002 as selector means, group the transducer array elements 1001 to form Fresnel rings so as to form an ultrasonic beam having a predetermined focal distance. That is, transducer array elements to be driven simultaneously are selected. The transmit beam former 1013 drives each of the transducer array elements 1001 with use of a delayed waveform according to the Fresnel distribution.

Meanwhile, when receiving ultrasonic waves, waves reflected at a place where variation in sound impedance expressed as the product of speed of sound and density in material is large are received. At this time, by receiving multiple beams, time resolution is increased. In the receive beam former 1020, the input signals received from transducer array elements 1001 via the grouping switch blocks 1002 and the selector 1011 are amplified by preamplifiers and then sampled and A/D converted to be temporarily stored in memory.

To be more specific, usually, immediately after the preamplifiers, the signals pass through TGC (Time Gain Control) amplifiers, controlled such that their gains gradually increases according to the increase in elapsed time from transmission and then are A/D converted. This is for compensating for the decrease in the amplitude of the received signals so as to keep the amplitude at the inputs of the A/D converter within a constant range, because ultrasonic waves propagating in a living body attenuates almost proportionally to their propagation distance and correspondingly the amplitude of the received signals decreases almost proportionally to the increase in elapsed time from transmission. By this means, the signal dynamic range can be prevented from decreasing due to amplitude quantization by the A/D conversion. In addition, it is well known that by making the signals pass through a band limiting filter before the A/D conversion, aliasing due to time axis quantization by the A/D conversion can be prevented.

In order to obtain receive wave directivity, after giving the received signal from each element temporarily stored in memory a delay corresponding to the position of the element, the received signals need to be summed to obtain a convergence effect. An optimum value of the delay to be given to the received signal from each element varies depending on the receive wave focal distance. Further, an optimum value of the receive wave focal distance in obtaining a good pulse echo image becomes greater proportionally to the increase in elapsed time from transmission and speed of sound. It is desirable to use a dynamic focus reception scheme which changes the delay to be given to the signal from each element according to elapsed time from transmission. With the configuration where the received signal from each element is temporarily stored in memory and read out to sum the received signals, this scheme can be relatively easily realized by control when reading out or storing.

The output signals of the receive beam former 1020 are stored into receive memories 1021 on a per receive beam basis. In the present embodiment, because four receive beams are formed, four receive memories 1021 are provided. The signals stored in these memories are sequentially selected and read by the selective switch 1022. The read signals pass through a filter 1023 and are sampled and held in an envelope detector 1024 to detect envelope signals. Then, the envelope signals are logarithmically compressed into display signals. A scan converter 1025 converts the signals into a two-dimensional image or a three-dimensional image, which is displayed on a display 1026 constituted by a CRT or a liquid crystal display.

(Simulation Example)

Next, an example of a receive sound field formed using the ultrasound diagnostic apparatus of the present embodiment will be shown below.

FIGS. 7 to 10 show distributions of first to fourth receive beams on a focal plane when the focal point is shifted in azimuth. In these figures, the receive gain is normalized for up to 10 mm in the x and y directions (azimuth). A 16 mm×16 mm reception aperture formed of 64×64 elements with an ultrasonic frequency of 3 MHz was equally divided into 4 rows×4 columns, and the receive beams were simultaneously formed respectively on the vertexes of a square of 4 mm in size on the focal plane 60 mm away from the reception surface. Although any receive beam is seen to have a side lobe, the gain of the side lobe relative to the main beam is about 0.2, which practically does not pose a problem.

The −6 dB beam width of these receive beams is about 5 mm. It is appropriate to set the distance between the centers of adjacent ones of the simultaneously formed receive beams at a beam width of about −3 to −6 dB as in this example. If the interval is narrower than this, the independency of information as an echo signal obtained from each receive beam becomes less, thus reducing the value of parallel reception. Conversely, if the interval between adjacent receive beams is set to be broader than this, the possibility that an echo from a reflector in the middle between adjacent receive beams may be missed in detection will increase. When a reception aperture is equally divided into 4 rows×4 columns, as in this example, multiple receive beams that are a beam width of about −3 to −6 dB apart can be simultaneously formed.

If the number of divisions is smaller than this, it is difficult to suppress the intensity of side lobes occurring when simultaneously forming multiple receive beams that are a beam width of about −3 to −6 dB apart to within an allowable range. Conversely, if the number of divisions becomes greater than this, the number of signal lines to be led out increases, while it becomes easy to simultaneously form multiple receive beams that are a beam width of about −3 to −6 dB apart.

The 64×64 transducer elements forming a two-dimensional ultrasound transducer array are equally divided into blocks, arranged in 4 rows×4 columns, each having 16×16 transducer elements, and each block has 15, less than 16, leading cable cores, and the transducer elements of each block are connected to the leading cable cores via 16 multiplexer switches having 16 inputs and 15 outputs. Generalizing this, a two-dimensional ultrasound transducer array is divided into n number of blocks of $M_1, M_2, \ldots$, or $M_n$ transducer elements, each block having $N_n$, less than $M_n$, leading lines, and the elements of an nth block are connected to $M_n$ multiplexer switches having one input and $N_n$ outputs, where n, M, N are natural numbers.

Where the scheme is applied to a rectangular reception aperture where, after the reception aperture is divided into multiple blocks, the elements of each block are connected by switches according to a connection pattern corresponding to the equal phase areas, the practical problem occurs that, because the element interval in a direction of a diagonal, longer than a side of a block, is finer than the element interval in a direction of the side, the number of leading lines necessary to make the receive beams deflect in the diagonal direction of the reception aperture is about twice the number of leading lines necessary to make the receive beams deflect in the side direction of the reception aperture.

Figure 11:
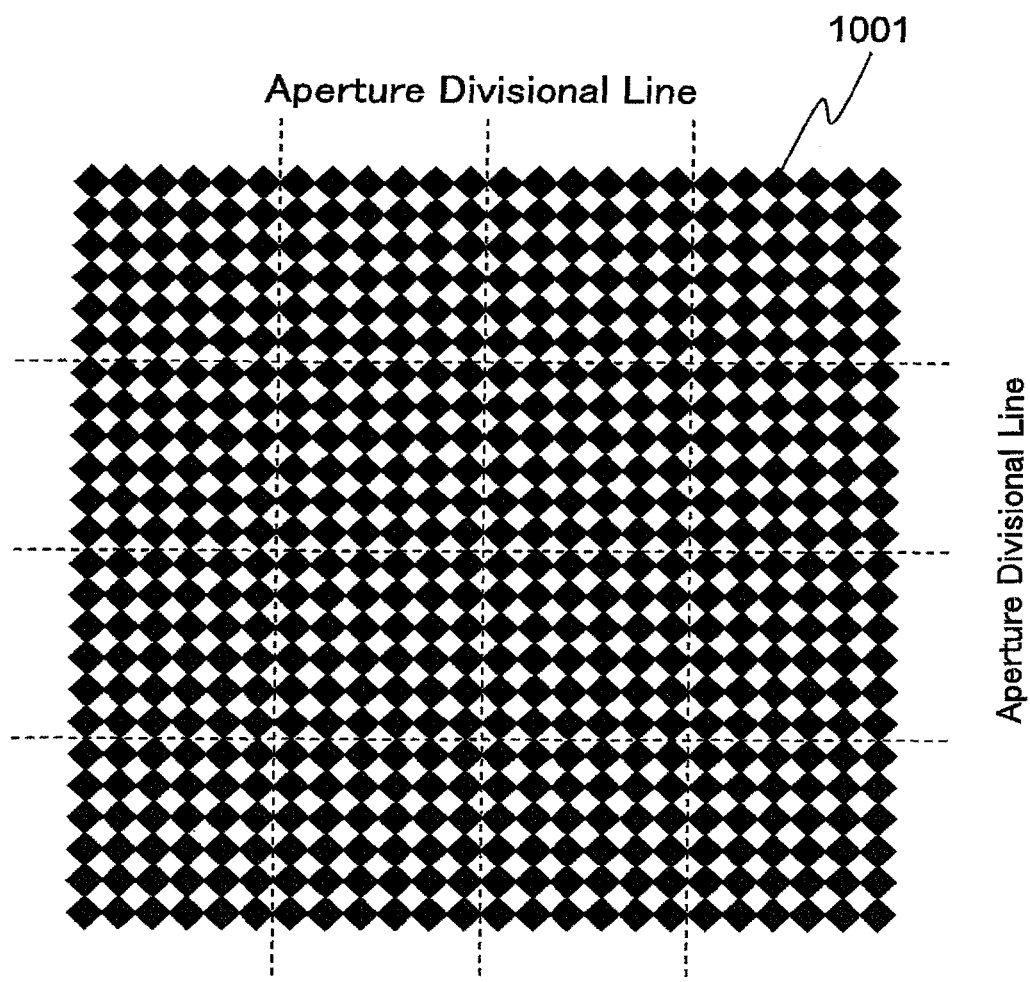
FIG. 11 shows the configuration of a two-dimensional array configured such that aperture divisional lines are at an angle greater than 0° and less than 90° to element divisional lines.
Figure 12:
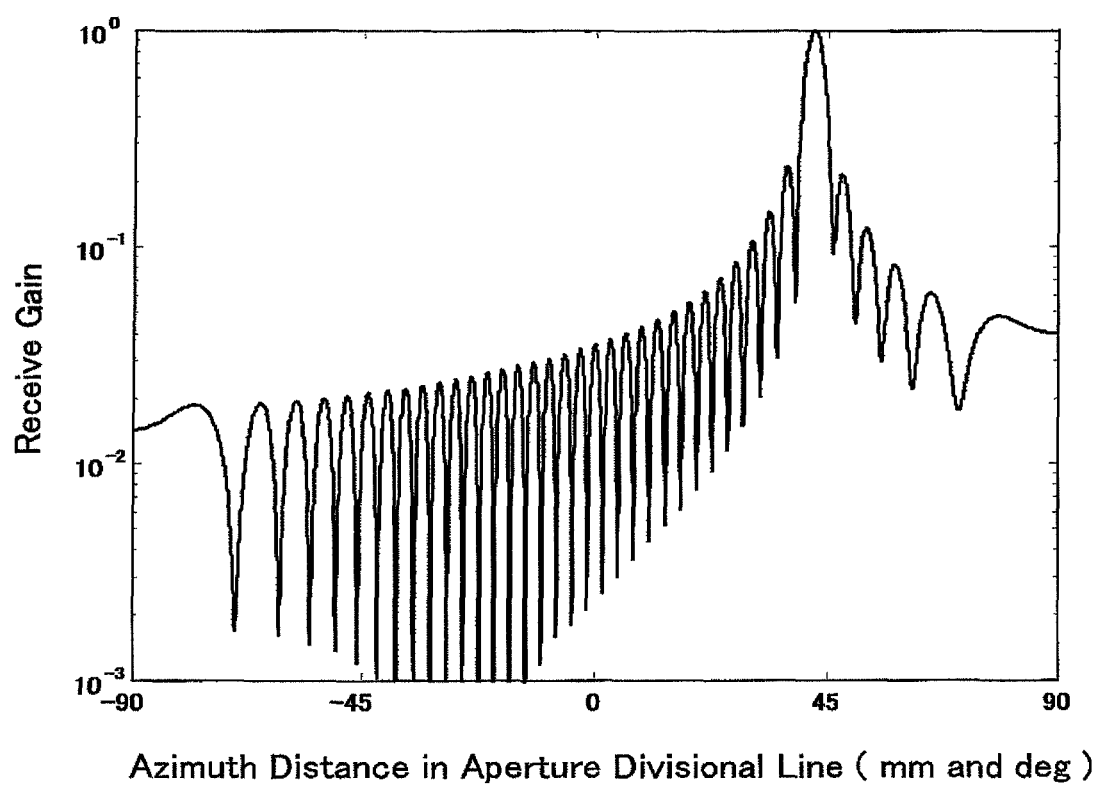
FIG. 12 shows distribution of receive beams in azimuth orthogonal or parallel to aperture divisional lines.
Figure 13:
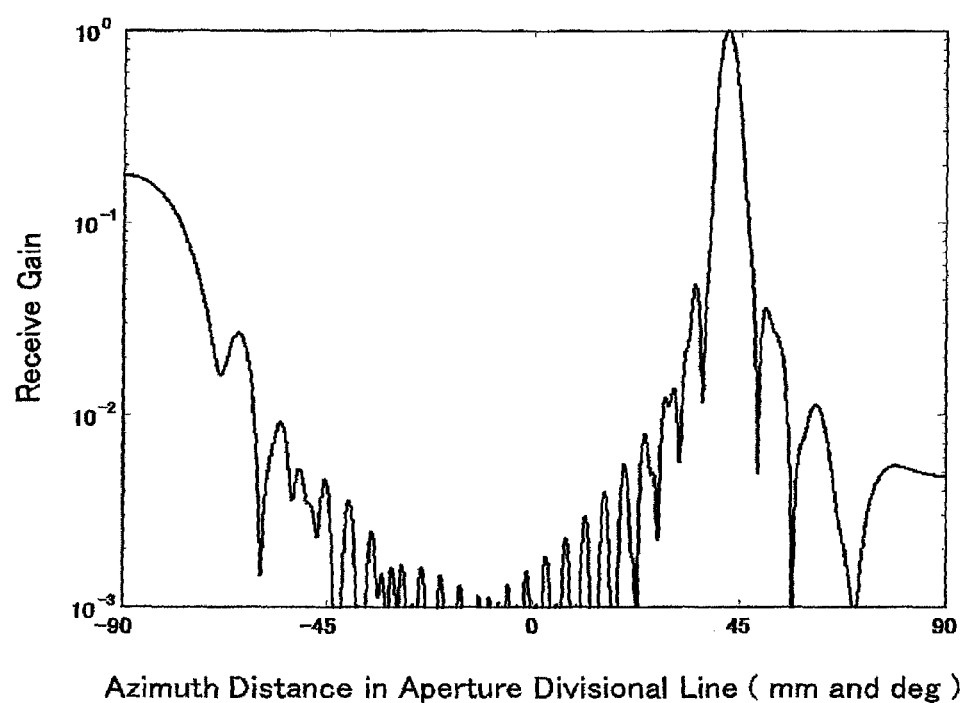
FIG. 13 shows distribution of receive beams in azimuth orthogonal or parallel to element divisional lines.

This problem can be solved by configuring the transducer array such that divisional lines for transducer elements are parallel to diagonals of the reception aperture, or blocks into which it is divided, as shown in FIG. 11. FIGS. 12 and 13 show receive beam distributions with such a transducer array when the receive beams deflect at 45 degrees respectively in an aperture divisional line direction and in an element divisional line direction. In this example, a 5 mm×5 mm reception aperture formed of 48×48 elements with an ultrasonic frequency of 2 MHz was equally divided into 4 rows×4 columns, 16 blocks, and receive beams with a focal distance of 57.3 mm were formed. In the figures, the azimuth distance in units of mm is the same in numerical value as the angle in units of deg. When the main beam is deflected in the element divisional line direction, a grating lobe occurs at 90 degrees on the opposite side to the deflection direction, but it is perceived to be outside the practical field of view, thus posing no substantial problem.

As described above, according to the present embodiment, multiple receive beams can be simultaneously formed with suppressing the number of leading cable cores. Hence, using an ultrasound probe connected by a not too thick cable, real-time three-dimensional imaging suitable for imaging the heart or the like can be achieved, which achievement can be significant in medical care and industry.

(Variants)

The present invention is not limited to the above embodiment, but various variants thereof as shown below are possible.

(1) Although in the above embodiment a single beam is formed and made to converge on a predetermined focal position when transmitting, multiple beams may be formed and transmitted.

(2) Although in the above embodiment a reception aperture is divided into 4×4 rectangles, 16 parts, it may be divided into parts of an equal angle of concentric rings.

<Second Embodiment>

A second embodiment of the present invention will be described below in detail with reference to FIGS. 14 to 37.

Figure 14:
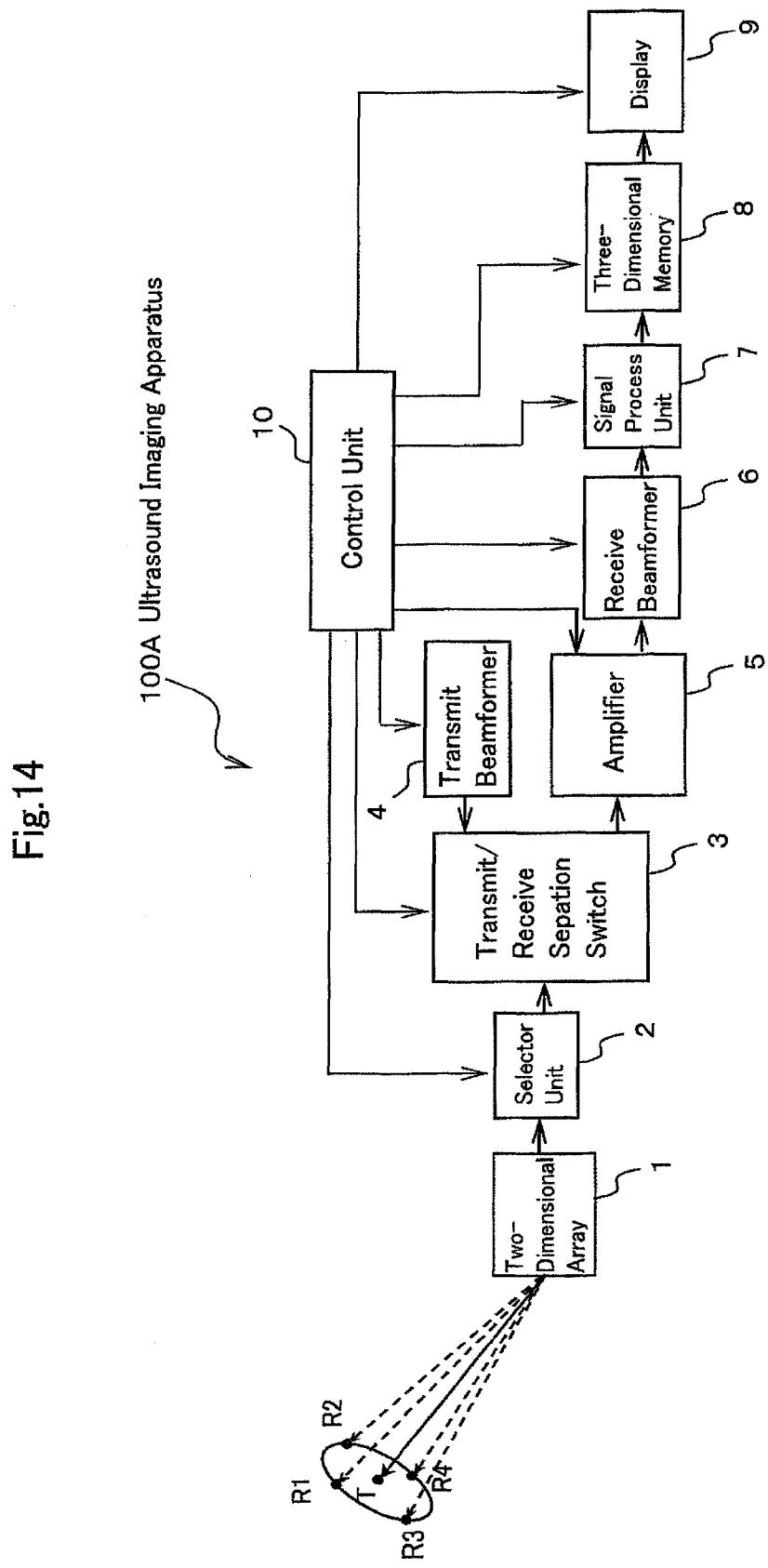
FIG. 14 is a block diagram showing the configuration of an ultrasound imaging apparatus of the present invention.

FIG. 14 is a block diagram showing the configuration of an ultrasound imaging apparatus 100A.

The ultrasound imaging apparatus 100A scans ultrasonic waves over an object to obtain real-time ultrasound three-dimensional images of an area to be imaged, and comprises a two-dimensional array 1, a selector unit 2, a transmit/receive separation switch 3, a transmit beam former 4, an amplifier 5, a receive beam former 6, a signal process unit 7, a three-dimensional memory 8, a display 9, and a control unit 10.

The two-dimensional array 1 has multiple electro-acoustic transducer elements (transducers) arranged in a plane or a curved surface, and each individual electro-acoustic transducer element is driven by the transmit beam former 4 to transmit ultrasonic waves and receives and converts ultrasonic waves reflected from an object into an electrical signal.

The selector unit 2 makes multiple input/output channels converge, as described later, which correspond to the electro-acoustic transducer elements of the two-dimensional array 1 so as to reduce the number of input/output channels of the two-dimensional array 1 to connect to the transmit/receive separation switch 3.

The transmit/receive separation switch 3, according to the control of the control unit 10, connects the transmit beam former 4 and the selector unit 2 when transmitting ultrasonic waves to an object, and connects the selector unit 2 and the amplifier 5 when receiving an echo from the object, thereby separating the transmit system (the transmit beam former 4) and the receive system (the amplifier 5 through the display 9).

The transmit beam former 4 electrically drives the two-dimensional array 1 to form a transmit beam T and scans the entire area to be imaged with shifting the direction of the transmit beam T according to the control of the control unit 10.

The amplifier 5 amplifies the received signals from the two-dimensional array 1 and outputs to the receive beam former 6.

The receive beam former 6 performs delaying and summation on each signal output from the selector unit 2 to simultaneously generate echo signals corresponding to multiple, e.g. four, receive beams R1 to R4 for the transmit beam T.

The signal process unit 7 performs preprocessing (logarithm conversion, filtering, gamma correction, etc.) on the echo signals from the receive beam former 6.

The three-dimensional memory 8 functions as a digital scan converter (DSC) and image memory, that is, converts the echo signals from the signal process unit 7 to digital form to be stored, produces three-dimensional image data to be stored, and outputs it in the form matching the display format of the display 9.

The display 9 reads three-dimensional image data from the three-dimensional memory 8 and displays a three-dimensional image or a tomogram of the object.

The control unit 10 controls the selector unit 2, the transmit/receive separation switch 3, the transmit beam former 4, the amplifier 5, the receive beam former 6, the signal process unit 7, the three-dimensional memory 8, and the display 9.

An ultrasound probe (not shown) includes the two-dimensional array 1 and the selector unit 2, and the transmit/receive separation switch 3 and the subsequent other components are provided on the main body (not shown). The ultrasound probe and the main body are connected by a cable, but because the number of input/output channels of the two-dimensional array 1 is reduced by the selector unit 2 as described later, the number of cores of this cable is also reduced. Therefore, the diameter of the cable can be made thin, thus improving the operability of the ultrasound imaging apparatus 100A.

Next, the concept of an example will be described where the two-dimensional array 1 is divided into four element blocks and where by assigning each element block four channels, the total number of channels of the two-dimensional array 1 is reduced to 16. The element block division according to the present invention is performed, e.g., as described later with reference to FIG. 23, but here, for convenience of description of the concept of element block division and group division, the case of dividing into element blocks (the first element blocks in claim 7) having its size in the lateral axis direction (the transverse direction in the figure; the second direction in claim 7) longer than its size in the elevational axis direction (the longitudinal direction in the figure; the first direction in claim 7) will be described.

Figure 15:
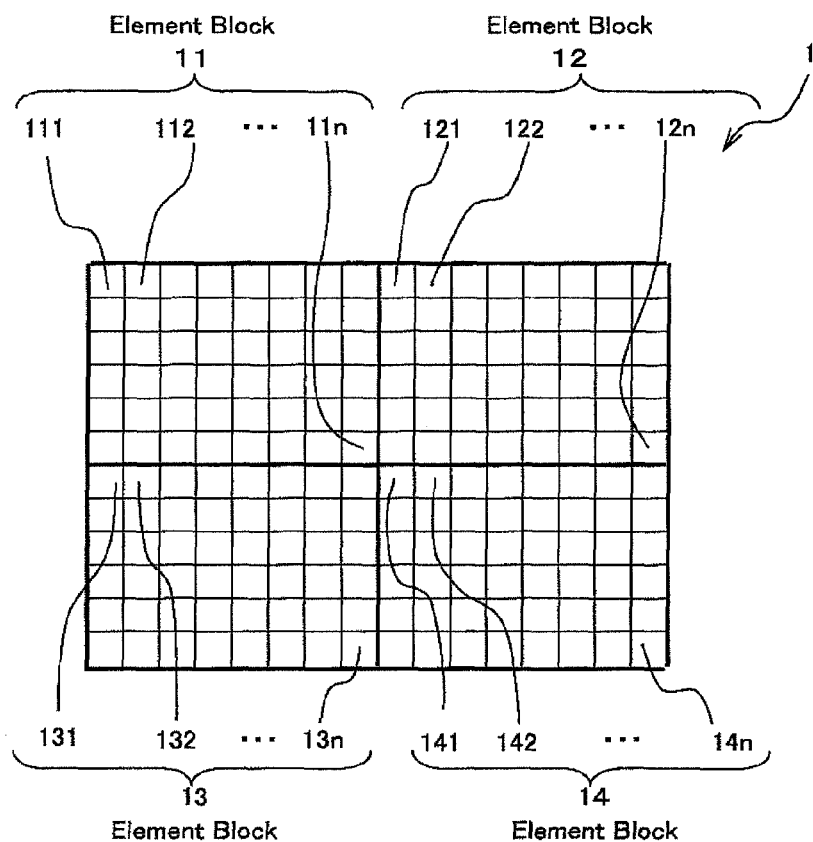
FIG. 15 illustrates the concept of the block division of the two-dimensional array.

FIG. 15 illustrates the concept of the block division of the two-dimensional array 1.

The two-dimensional array 1 has 4n electro-acoustic transducer elements arranged in a matrix. Description will be made of the case where the arrangement surface is a plane, but the arrangement surface may be curved. This two-dimensional array 1 is divided into two parts in the elevational axis direction (the longitudinal direction in the figure; the first direction in claim 7) and into two parts in the lateral axis direction (the transverse direction in the figure; the second direction in claim 7) to form four element blocks 11 to 14 of n electro-acoustic transducer elements each. As shown in the figure, the element block 11 comprises electro-acoustic transducer elements 111 to 11$n$; the element block 12 comprises electro-acoustic transducer elements 121 to 12$n$; the element block 13 comprises electro-acoustic transducer elements 131 to 13$n$; and the element block 14 comprises electro-acoustic transducer elements 141 to 14$n$.

An example where rectangular electro-acoustic transducer elements are arranged in a matrix is described, but instead of the rectangle, electro-acoustic transducer elements of another shape such as a triangle or a hexagon may be used, or instead of the matrix, the elements may be arranged in a honeycomb or randomly.

Figure 16:
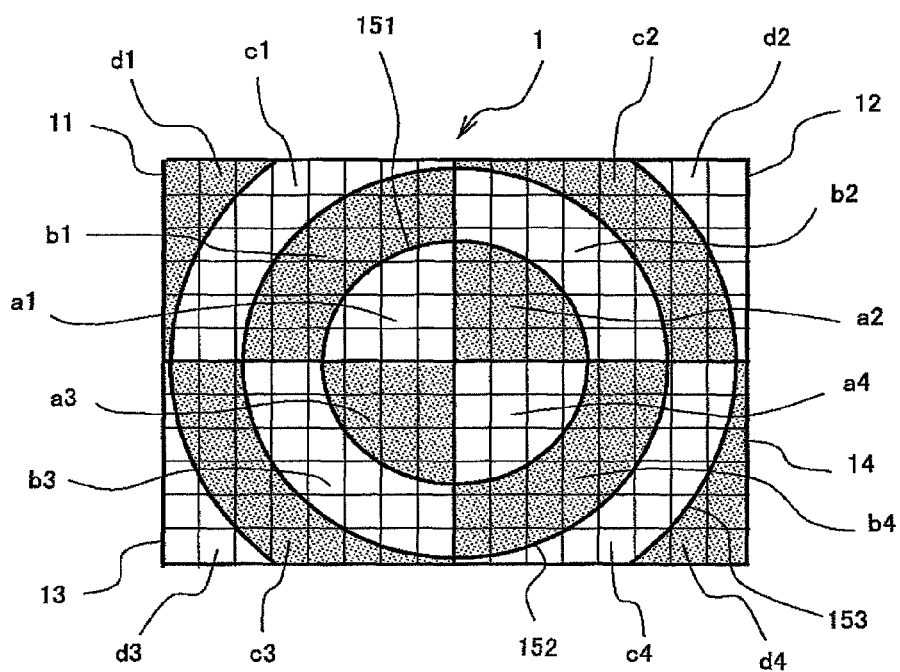
FIG. 16 illustrates the way to group electro-acoustic transducer elements.

FIG. 16 illustrates the way to group the electro-acoustic transducer elements 111 to 11$n$, 121 to 12$n$, 131 to 13$n$, and 141 to 14$n$. In the figure, the areas of adjacent groups are distinguished from each other by being made shaded or hollow.

The electro-acoustic transducer elements 111 to 11$n$, 121 to 12$n$, 131 to 13$n$, and 141 to 14$n$ in the element blocks 11 to 14 are divided according to three concentric circles 151 to 153 into groups.

That is, the element block 11 is grouped into four groups a1 to d1, and one channel is assigned to each group a1 to d1. Likewise, the element block 12 is grouped into four groups a2 to d2, and one channel is assigned to each group a2 to d2; the element block 13 is grouped into four groups a3 to d3, and one channel is assigned to each group a3 to d3; and the element block 14 is grouped into four groups a4 to d4, and one channel is assigned to each group a4 to d4.

Since the electro-acoustic transducer elements of each of the four element blocks 11 to 14 are grouped such that the transmit beam T is formed in the direction that the two-dimensional array 1 faces and that the receive beams R1 to R4 are formed around the transmit beam T, the center of the concentric circles 151 to 153 coincides with the center of the two-dimensional array 1. Thus, when the beams are deflected in the elevational axis direction, the center of the concentric circles 151 to 153 deviates in the elevational axis direction, and when the beams are deflected in the lateral axis direction, the center of the concentric circles 151 to 153 deviates in the lateral axis direction.

That is, in scanning an object, in order to change the beam direction, the group division is changed, but the block division need not be changed.

FIG. 17 is a block diagram showing in detail the configuration of the selector unit 2.

The selector unit 2 functions to realize the grouping of the electro-acoustic transducer elements, and comprises a selector 21 connected to the element block 11, a selector 22 connected to the element block 12, a selector 23 connected to the element block 13, and a selector 24 connected to the element block 14.

Figure 17A:
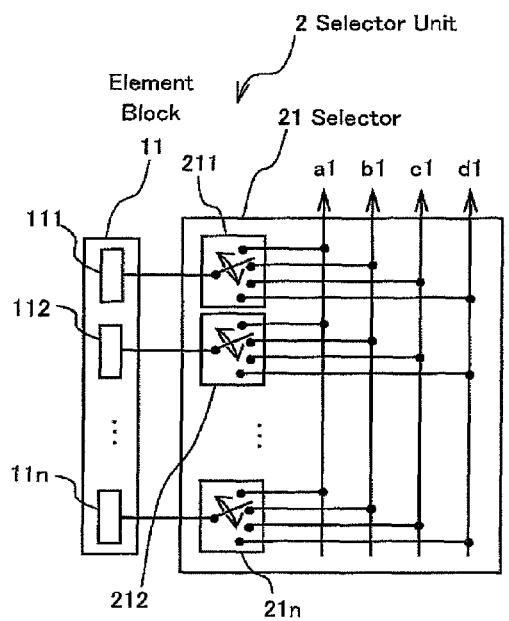
FIG. 17 is a block diagram showing in detail the configuration of a selector unit.

As shown in FIG. 17A, the selector 21 comprises switches 211 to 21n each for connecting one of the electro-acoustic transducer elements 111 to 11n forming the element block 11 to any of the four channels for the groups a1 to d1. The switches 211 to 21n, according to the control of the control unit 10, connect each of the electro-acoustic transducer elements 111 to 11n to one of the four channels for the groups a1 to d1 according to the scan direction, thereby performing the grouping.

Figure 17B:
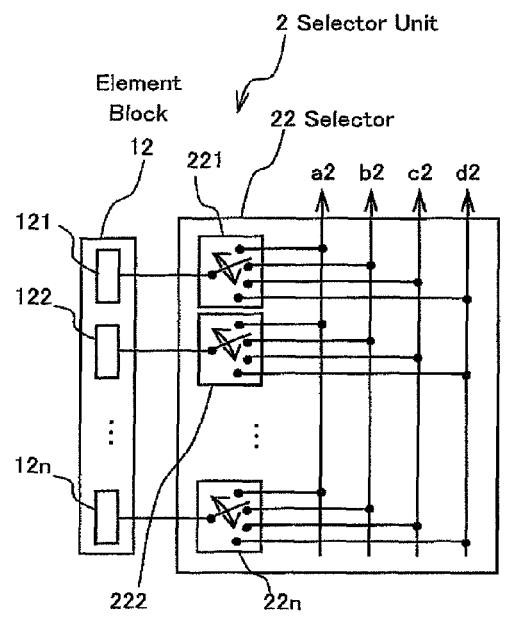

As shown in FIG. 17B, the selector 22 comprises switches 221 to 22n each for connecting one of the electro-acoustic transducer elements 121 to 12n forming the element block 12 to any of the four channels for the groups a2 to d2. The switches 221 to 22n, according to the control of the control unit 10, connect each of the electro-acoustic transducer elements 121 to 12n to one of the four channels for the groups a2 to d2 according to the scan direction, thereby performing the grouping.

Figure 17C:
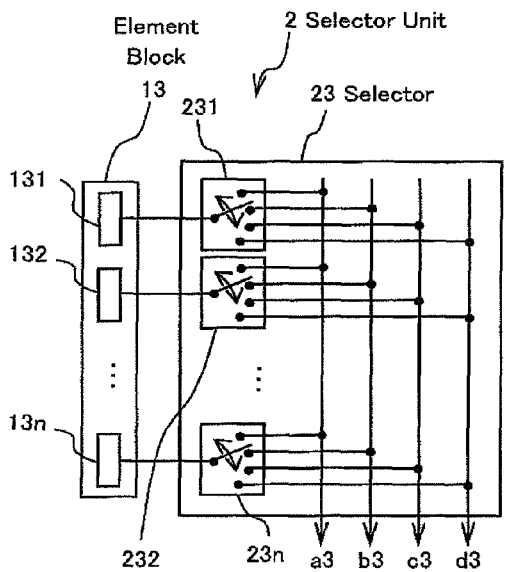

As shown in FIG. 17C, the selector 23 comprises switches 231 to 23n each for connecting one of the electro-acoustic transducer elements 131 to 13n forming the element block 13 to any of the four channels for the groups a3 to d3. The switches 231 to 23n, according to the control of the control unit 10, connect each of the electro-acoustic transducer elements 131 to 13n to one of the four channels for the groups a3 to d3 according to the scan direction, thereby performing the grouping.

Figure 17D:
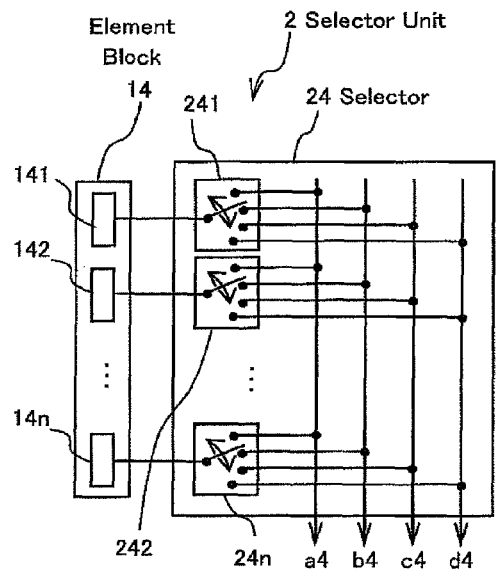

As shown in FIG. 17D, the selector 24 comprises switches 241 to 24n each for connecting one of the electro-acoustic transducer elements 141 to 14n forming the element block 14 to any of the four channels for the groups a4 to d4. The switches 241 to 24n, according to the control of the control unit 10, connect each of the electro-acoustic transducer elements 141 to 14n to one of the four channels for the groups a4 to d4 according to the scan direction, thereby performing the grouping.

Figure 18:
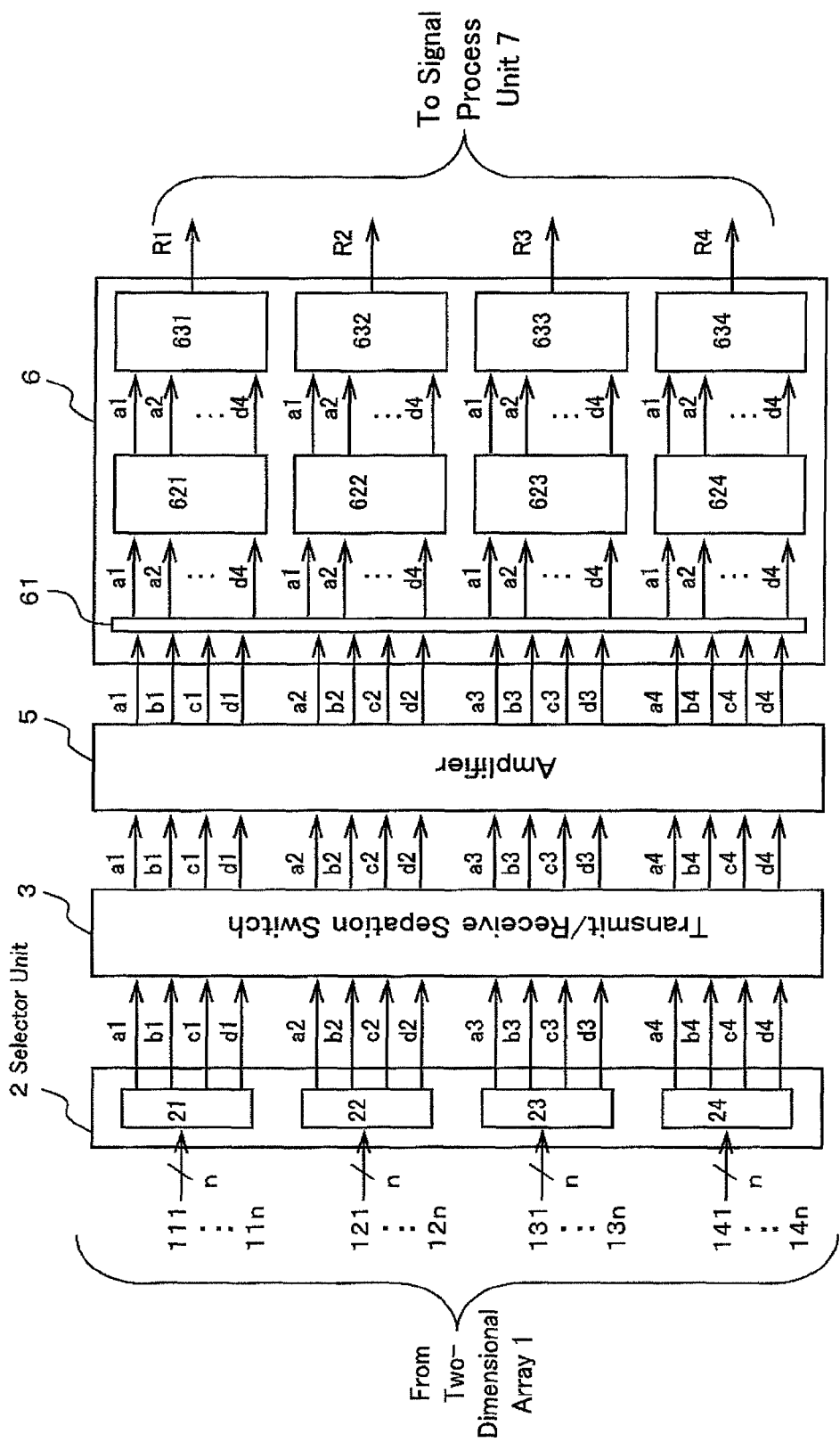
FIG. 18 is a block diagram showing in detail the configuration of the selector unit through a receive beam former for processing received signals from selectors.

FIG. 18 is a block diagram showing in detail the configuration of the selector unit 2 through the receive beam former 6 for processing the received signals from the selectors 21 to 24.

When receiving waves reflected from the object, the transmit/receive separation switch 3 connects the channels for the groups a1 to d1, a2 to d2, a3 to d3, and a4 to d4 of the selectors 21, 22, 23, 24 to the amplifier 5 according to the control of the control unit 10.

The amplifier 5 amplifies the received signal transmitted over each of the channels with a predetermined gain for the channel according to the control of the control unit 10 and outputs to the receive beam former 6.

The receive beam former 6 functions to form the four receive beams R1 to R4 and comprises a bus 61, delay units 621 to 624, and adders 631 to 634.

In the bus 61, each of the channels for the groups a1 to d1, a2 to d2, a3 to d3, and a4 to d4 branches into four channels, which are respectively connected to the delay units 621 to 624. Thereby, the same signal is inputted to all the delay units 621 to 624.

The delay units 621 to 624 delay the signal by a different delay for each channel so as to form the receive beams R1 to R4 deflected relative to the transmit beam and to perform dynamic focusing reception in the depth direction. To be specific, the delay units 621 to 624 give the continuously received signal the combined delay of a delay for the focal point and a delay for the deflections of the receive beams R1 to R4, and by repeating the above process, performs dynamic focusing reception for a different focal point as well.

The adders 631 to 634 add the outputs of the delay units 621 to 624 respectively for the receive beams R1 to R4 and output the added signals to the signal process unit 7 (see FIG. 14).

Referring back to FIG. 14, the signal process unit 7 performs signal processing such as filtering, interpolation, detection, etc., on the signals associated with the receive beams R1 to R4 from the adders 631 to 634 and outputs to the three-dimensional memory 8.

The three-dimensional memory 8 produces and stores three-dimensional image data. Using this three-dimensional image data, the display 9 performs three-dimensional display or the display of a sectional view.

The example where the number (here 4n) of channels of the two-dimensional array 1 is reduced to 16 has been described. In practice, considering required imaging performance such as image quality, the scale of the apparatus, costs, and convenience of handling, the number of electro-acoustic transducer elements and the reduced number of channels are determined. For example, using the two-dimensional array 1 having several thousand electro-acoustic transducer elements (several thousand channels), the number of channels is reduced to about 100 to 200. From the view point of suppressing a grating lobe, the larger number of channels after the reduction is more preferable, but from the view point of reducing circuit size and the number of cores as connection lines thereby improving operability, the smaller number of channels after the reduction is more preferable.

Figure 19:
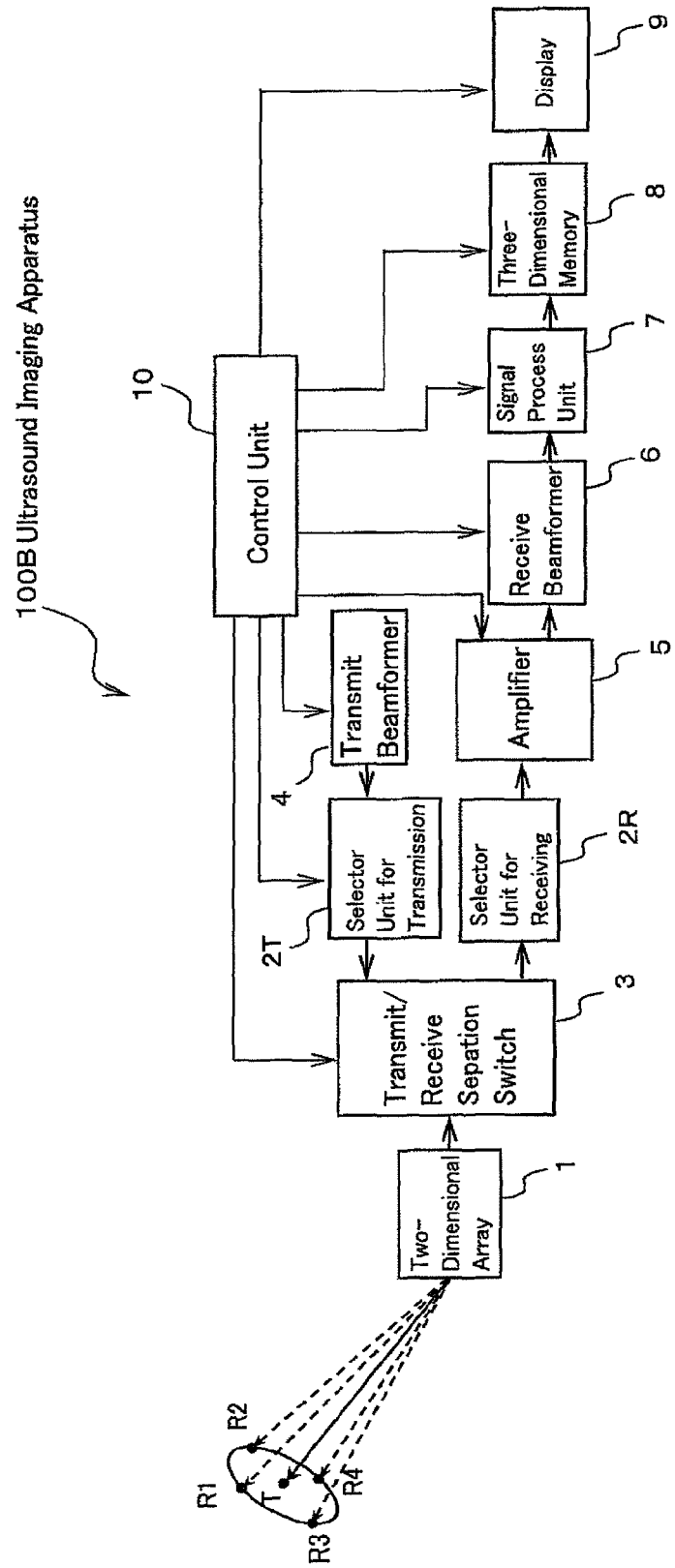
FIG. 19 is a block diagram showing the configuration of another ultrasound imaging apparatus of the present invention.

FIG. 19 is a block diagram showing the configuration of another ultrasound imaging apparatus 100B of the present invention.

The ultrasound imaging apparatus 100B is substantially the same in configuration as the ultrasound imaging apparatus 100A except that it comprises a transmission selector unit 2T and a receiving selector unit 2R instead of the selector unit 2.

The transmit/receive separation switch 3, when transmitting ultrasonic waves, connects the transmission selector unit 2T and the two-dimensional array 1 and, when receiving ultrasonic waves, the two-dimensional array 1 and the receiving selector unit 2R.

The transmission selector unit 2T is substantially the same in configuration as the selector unit 2, and makes multiple input channels to the transmit/receive separation switch 3 converge which correspond to the electro-acoustic transducer elements of the two-dimensional array 1, thus grouping electro-acoustic transducer elements of each of the element blocks 11 to 14. The input terminals of the transmission selector unit 2T are connected to the output terminals of the transmit beam former 4.

The receiving selector unit 2R is substantially the same in configuration as the selector unit 2, and makes multiple output channels from the transmit/receive separation switch 3 converge which correspond to the electro-acoustic transducer elements of the two-dimensional array 1, thus grouping electro-acoustic transducer elements of each of the element blocks 11 to 14 into a grouping pattern different from that of the transmission selector unit 2T. The output terminals of the receiving selector unit 2R are connected to the input terminals of the amplifier 5.

According to the ultrasound imaging apparatus 100B, it is possible to group into a different pattern between when transmitting and when receiving. Hence, the place where a grating lobe occurs can be changed between when transmitting and when receiving, thus improving image quality.

Figure 20:
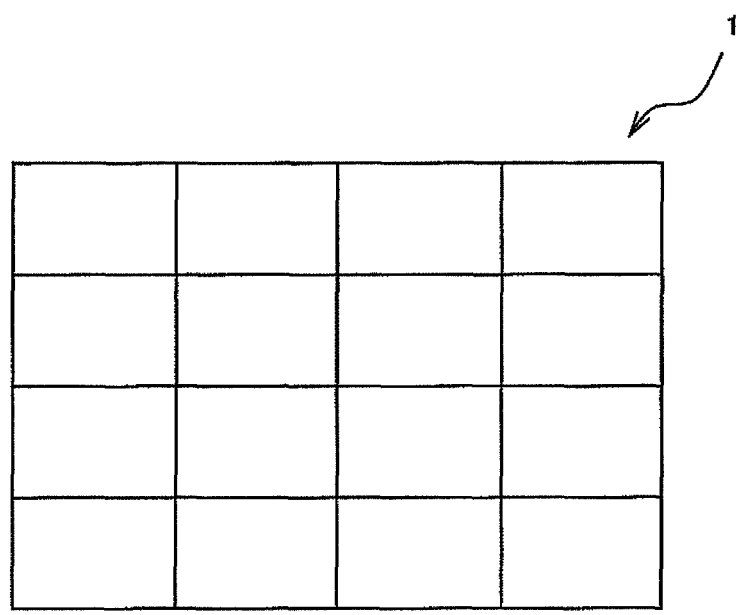
FIG. 20 is a pattern diagram showing the block division of a two-dimensional array as a comparative example.

FIG. 20 is a pattern diagram showing the block division of the two-dimensional array 1 as a comparative example.

In this comparative example, the two-dimensional array 1 is divided into four parts in the elevational axis direction (the longitudinal direction in the figure) and into four parts in the lateral axis direction (the transverse direction in the figure), and thus divided into 16 element blocks. Here, in each element block, 12 electro-acoustic transducer elements are arranged in the elevational axis direction and 16 elements are arranged in the lateral axis direction. Thus, the number of electro-acoustic transducer elements per element block is 192. The two-dimensional array 1 has a total of 3,072 elements. The input/output channels (3,072 channels) of the two-dimensional array 1 are grouped so as to be reduced to 128 channels, and thus the number of channels per element block is 8.

FIG. 21 is a pattern diagram showing the grouping as a comparative example. FIG. 21A shows the case of forming the transmit beam in the direction that the two-dimensional array 1 faces, and FIG. 21B shows the case of deflecting the beam in the lateral axis direction (the transverse direction in the figure).

The element pitch of the two-dimensional array 1 of FIGS. 21A and 21B is preferably no greater than half the wavelength of ultrasonic waves transmitted and received, in order to suppress a grating lobe. For example, if the center frequency of ultrasonic waves is 2.5 MHz, the element pitch may be 0.3 mm. In this case, the size of the two-dimensional array 1 is 19.2 mm in the lateral axis direction and 14.4 mm in the elevational axis direction. When obtaining an image of the heart inside the body, because of picking up through between ribs, the representative size in the elevational axis direction of the two-dimensional array 1 needs to be about 20 plus several mm in maximum.

FIG. 21A shows a pattern with the focal distance F of 50 mm in the case where the transmit beam is directed in a direction perpendicular to the two-dimensional array 1, and FIG. 21B shows a pattern with the focal distance F of 50 mm in the case where the beam is deflected at 30° in the lateral axis direction relative to the direction perpendicular to the two-dimensional array 1. In either case, the pattern is a concentric circular or arc-shaped pattern with the beam axis as the center.

Figure 22:
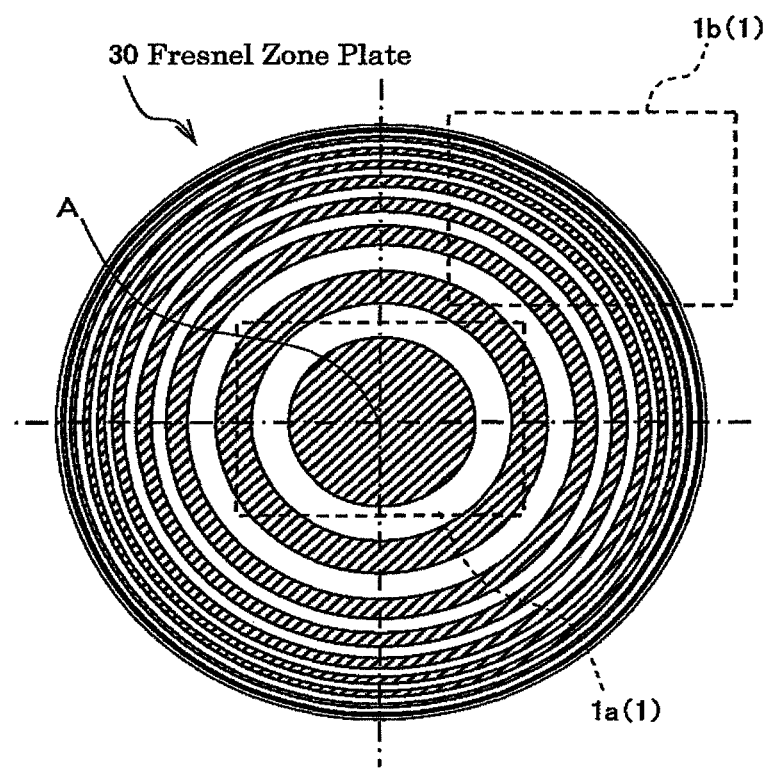
FIG. 22 illustrates a relationship between a Fresnel zone plate and the two-dimensional array.

FIG. 22 illustrates a relationship between a Fresnel zone plate 30 and the two-dimensional array 1.

The Fresnel zone plate 30 has annular areas defined by concentric circles having radiuses proportional to the square roots of 1, 2, 3, . . . and having as their center the center axis A of the transmit beam when transmitted in the direction that the two-dimensional array 1 faces, every second one of the annular areas being opaque to ultrasonic waves. Thus, the width of the annular area further away from the center axis A is narrower. In FIG. 22, the hatched areas of the Fresnel zone plate 30 are opaque to ultrasonic waves with the hollow areas transparent, but the hatched areas may be transparent with the open areas opaque.

The size of the concentric circles of the Fresnel zone plate 30, that is, a grouping pattern for the two-dimensional array 1 is determined by the focal distance. FIG. 22 shows the case where, with the focal distance F of 50 mm, the size of the two-dimensional array 1 is 19.2 mm in the lateral axis direction and 14.4 mm in the elevational axis direction.

In order to prevent a grating lobe from occurring, the grouping pattern for the two-dimensional array 1 needs to be finer than the pattern of the annular areas of the Fresnel zone plate 30. As the relative position of the two-dimensional array 1 becomes closer to the center axis A of the Fresnel zone plate 30, the grouping pattern for the two-dimensional array 1 can be coarser. Conversely, as it becomes further away from the center axis A of the Fresnel zone plate 30, the grouping pattern for the two-dimensional array 1 needs to be finer.

As shown in FIG. 22, for example, when the beam is formed in the front direction, the relative position of the two-dimensional array 1 in the Fresnel zone plate 30 is as indicated by 1a. Thus, because the widths of the annular areas of the Fresnel zone plate 30 are wide, the number of groups of the two-dimensional array 1 may be small. However, when the beam deflected relative to the front direction is formed, the relative position of the two-dimensional array 1 in the Fresnel zone plate 30 is as indicated by 1b. Thus, because the widths of the annular areas of the Fresnel zone plate 30 are narrow, the two-dimensional array 1 has to be divided finely into annular groups corresponding to these annular areas, or otherwise a grating lobe would occur.

However, there is a limit to making the element pitch of the two-dimensional array 1 finer, and there is a restriction on the number of channels assigned to each element block of the two-dimensional array 1. Therefore, when the beam is deflected to a great degree, image quality is object to a grating lobe because the grouping pattern of electro-acoustic transducer elements cannot be made finer than the pattern of the annular areas of the Fresnel zone plate 30.

From the view point of suppressing a grating lobe, when the beam is deflected in the lateral axis direction, the interval between groups adjacent in the lateral axis direction is preferably at a pitch of one element. However, in the example shown, e.g., in FIG. 21B, since 8 channels are assigned to each element block, the interval between adjacent groups is almost at a pitch of two elements. Hence, a large grating lobe occurs, thus degrading image quality.

As described above, where electro-acoustic transducer elements are divided into blocks and further grouped to reduce the number of channels, and multipoint simultaneous reception is performed, the reduction in the number of channels and suppressing a grating lobe are in a conflicting relationship.

Next, the concept of suppressing a grating lobe by setting the block division and grouping of the two-dimensional array 1 to obtain a real-time three-dimensional ultrasonic image of higher quality under the condition of such a conflicting relationship will be described in detail.

Figure 23:
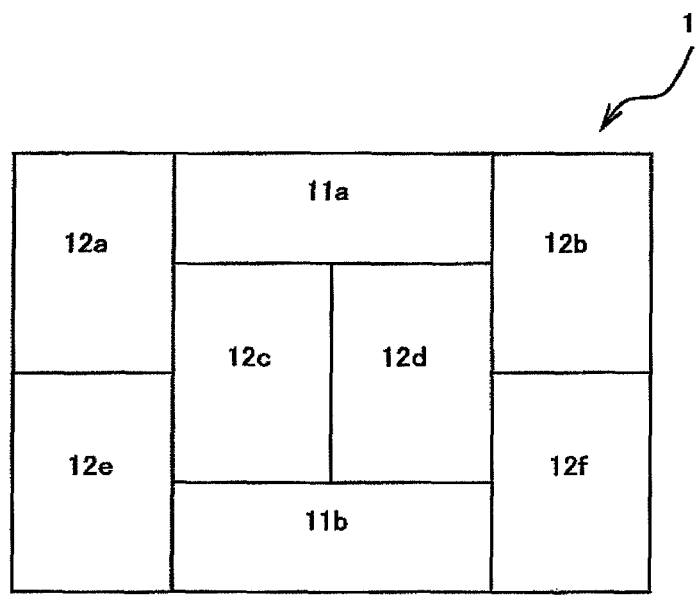
FIG. 23 is a pattern diagram showing an example of the block division of the two-dimensional array according to the present invention.

FIG. 23 is a pattern diagram showing an example of the block division of the two-dimensional array 1 according to the present invention.

In this example, in the two-dimensional array 1, there are mixed (laterally long) element blocks 11a, 11b of which the size in the elevational axis direction (the longitudinal direction in the figure) is smaller than the size in the lateral axis direction (the transverse direction in the figure) and element blocks 12a to 12f of which the size in the lateral axis direction is smaller than the size in the elevational axis direction, these blocks being arranged line-symmetric with respect to either of the lateral axis and the elevational axis.

Here, let k be the number of channels assigned to one element block, m1 be the number of elements of element block 11a, 11b along its edge in the lateral axis direction (the transverse direction in the figure), m2 be the number of elements along its edge in the elevational axis direction (the longitudinal direction in the figure), m3 be the number of elements of element block 12a to 12f along its edge in the lateral axis direction (the transverse direction in the figure), and m4 be the number of elements along its edge in the elevational axis direction (the longitudinal direction in the figure).

In this case, it is desirable that m2≤k. This is because, when the beam is deflected in the lateral axis direction, the interval between respective groups for the channels almost equals the element pitch in the elevational axis-wise long element blocks 12a to 12f, thus suppressing a grating lobe.

Further, in this case, it is desirable that m3≤k. This is because, when the beam is deflected in the elevational axis direction, the interval between respective groups for the channels almost equals the element pitch in the elevational axis-wise short element blocks 11a, 11b, thus suppressing a grating lobe.

Figure 24A:
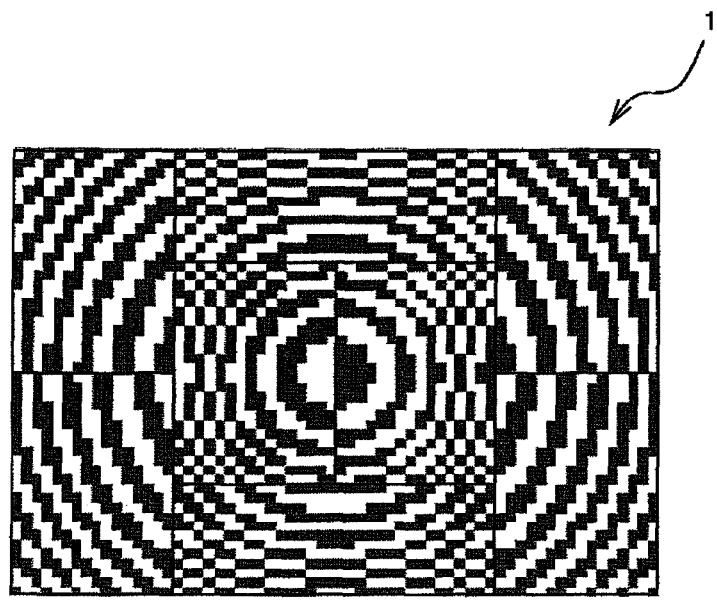
FIG. 24 is pattern diagrams showing the grouping according to the present invention.
Figure 24B:
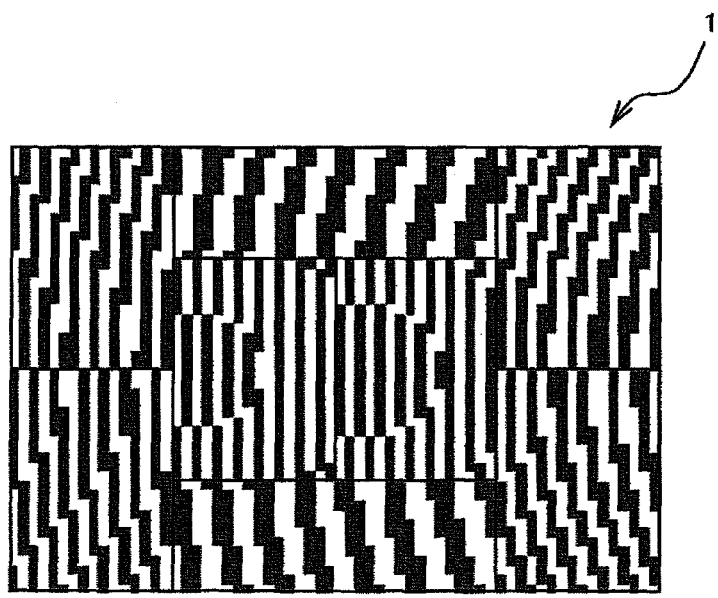

FIG. 24 is pattern diagrams showing the grouping according to the present invention. FIG. 24A shows the case of forming the beam in the direction that the two-dimensional array 1 faces, and FIG. 24B shows the case of deflecting the beam in the lateral axis direction (the transverse direction in the figure).

The conditions for the grouping is the same as the comparative example (see FIGS. 21A, 21B) except that the block division is different.

Comparing the patterns of the comparative example and of the present invention, it is seen that according to the block division method of the present invention, the intervals between concentric circular groups are finer with the same number of channels, and thus delays can be controlled more appropriately in forming the beams.

FIG. 25 is pattern diagrams showing other examples of the block division of the two-dimensional array 1 according to the present invention.

Figure 25A:
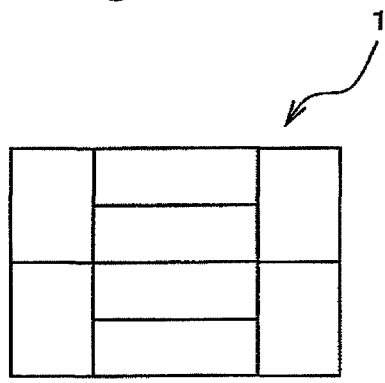
FIG. 25 is pattern diagrams showing other examples of the block division of the two-dimensional array according to the present invention.
Figure 25B:
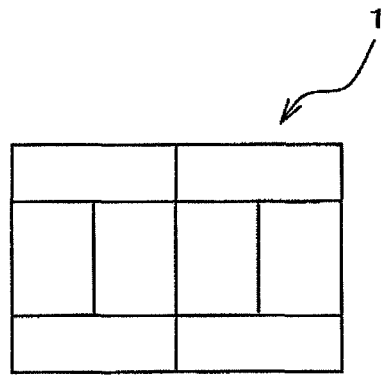
Figure 25C:
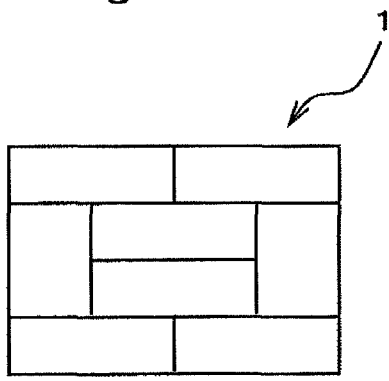
Figure 25D:
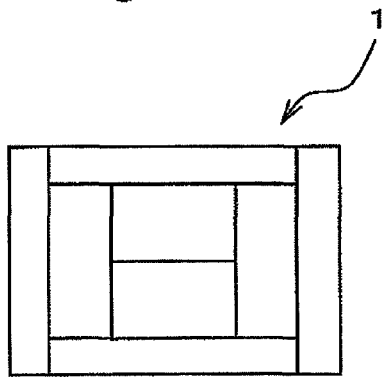
Figure 25E:
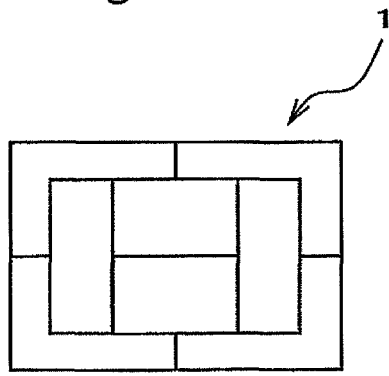

In two-dimensional arrays 1 shown in FIGS. 25A to 25E, there are mixed (longitudinally long) element blocks of which the size in the elevational axis direction (the longitudinal direction in the figure) is larger than the size in the lateral axis direction (the transverse direction in the figure) and (laterally long) element blocks of which the size in the lateral axis direction is larger than the size in the elevational axis direction, these blocks being arranged symmetric with respect to both the lateral axis and the elevational axis. The element blocks may be rectangular, or non-rectangular, e.g., L-shaped element blocks may be combined as shown in FIG. 25E. Although cases of the rectangular two-dimensional array 1 have been illustrated, the two-dimensional array 1 may be of another shape such as an ellipse.

Next, a method of determining the grouping pattern for each element block according to the present invention will be described in detail with reference to FIGS. 26 to 28.

Figure 26:
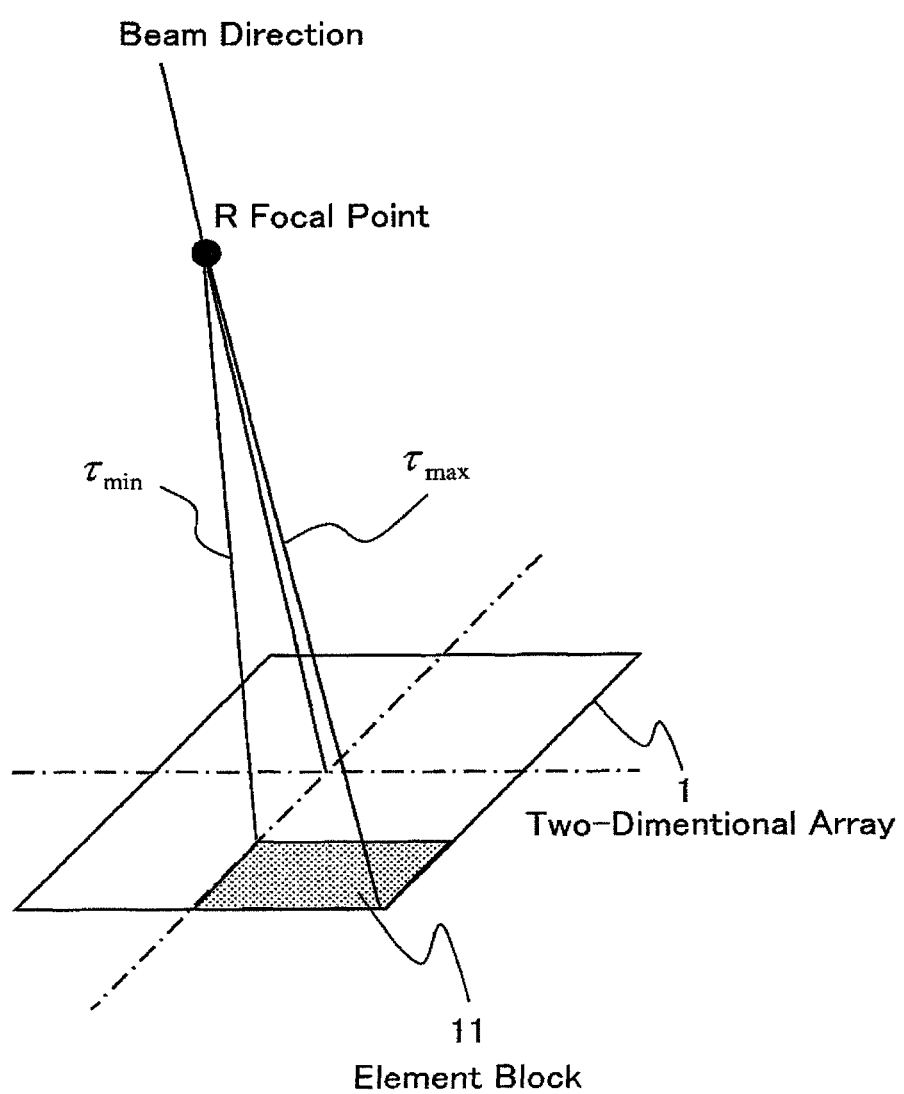
FIG. 26 is a conceptual diagram showing a geometric positional relationship between an element block of the blocks into which the two-dimensional array is divided and a focal point for determining the grouping pattern.

FIG. 26 is a conceptual diagram showing a geometric positional relationship between an element block 11 of the blocks into which the two-dimensional array 1 is divided and a focal point R for determining the grouping pattern.

Let max be a delay to be given to the electro-acoustic transducer element furthest away from the focal point R from among the electro-acoustic transducer elements in the element block 11 and min be a delay to be given to the electro-acoustic transducer element closest to the focal point R.

Figure 27:
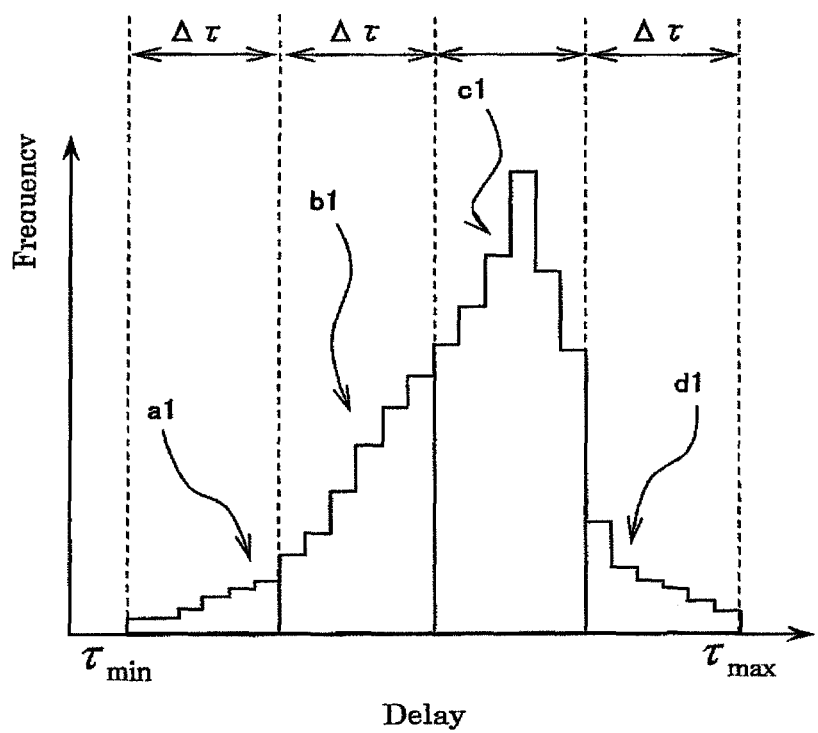
FIG. 27 is a histogram showing a frequency distribution of delays to be given to the electro-acoustic transducer elements in an element block, to illustrate the grouping method for the comparative example.

FIG. 27 is a histogram showing a frequency distribution of delays to be given to the electro-acoustic transducer elements in the element block 11, to illustrate the grouping method for the comparative example.

In this grouping method, groups are formed in the element block 11 such that delay intervals (steps) between channels become the same regardless of the occurrence frequency of each delay. That is, letting max be the maximum delay for the element block 11 and min be the minimum delay, the electro-acoustic transducer elements in the element block 11 are grouped into four groups a1 to d1 such that a delay interval $\Delta\pi$ between adjacent channels equals $(\pi max - \pi min)/4$. The grouping pattern shown in FIGS. 21A, 21B, 24A, 24B were obtained by making delay intervals between channels in each element block be the same according to this method.

In this grouping, when forming the same beams, the same weight in summation is given to the channels associated with the groups b1, c1 for which the frequency (the number of elements) of giving delays is high, so that their influence on beam formation is relatively large, and to the channels associated with the groups a1, d1 for which the frequency (the number of elements) of giving delays is low, so that their influence on beam formation is relatively small.

That is, large weight should be applied to the channels associated with the groups b1, c1 whose number of elements is large, and small weight should be applied to the channels associated with the groups a1, d1 whose number of elements is small, but due to the above-mentioned factor, the influence of the channels associated with the groups b1, c1 becomes relatively smaller, and the influence of the channels associated with the groups a1, d1 becomes relatively larger. Therefore, the effect of the grouping may not be sufficient.

Further, because electrical characteristics of each channel such as impedance are different between the group c1 whose number of elements is very large and the group a1 whose number of elements is very small, conditions for driving electro-acoustic transducer elements for each channel vary, thus complicating a correction circuit or degrading image quality.

Figure 28:
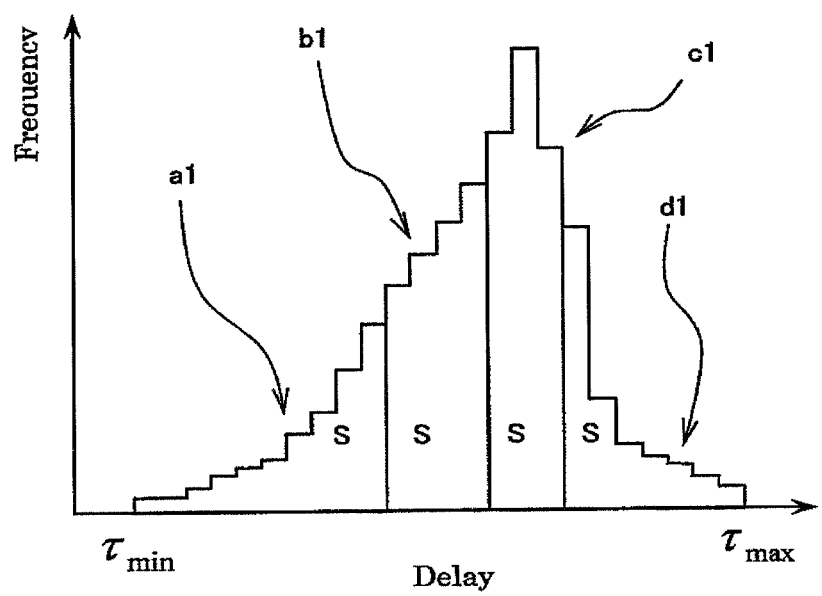
FIG. 28 is a histogram showing a frequency distribution of delays to be given to the electro-acoustic transducer elements in an element block, to illustrate the grouping method of the present embodiment.

FIG. 28 is a histogram showing a frequency distribution of delays to be given to the electro-acoustic transducer elements in the element block 11, to illustrate the grouping method of the present embodiment.

In this grouping, the electro-acoustic transducer elements in the element block 11 are grouped such that the integral S of the occurrence frequency of the delay over the delay range of each group is equal for each of the channels associated with the groups a1 to d1, that is, the area in the histogram of FIG. 28 is equal for each channel.

To be specific, if the electro-acoustic transducer elements are the same in size and shape, they are grouped in ascending (or descending) order of the magnitude of the delay to be given to them such that the number of electro-acoustic transducer elements belonging to each group is the same.

With this grouping, because the groups b1, c1 high in the frequency of having large influence on beam formation are controlled finely in terms of delay, the occurrence of a grating lobe can be suppressed. Further, because the number of electro-acoustic transducer elements grouped for each channel is substantially the same, electrical characteristics of each channel such as impedance become the same, thus reducing circuit size and improving image quality.

Figure 30:
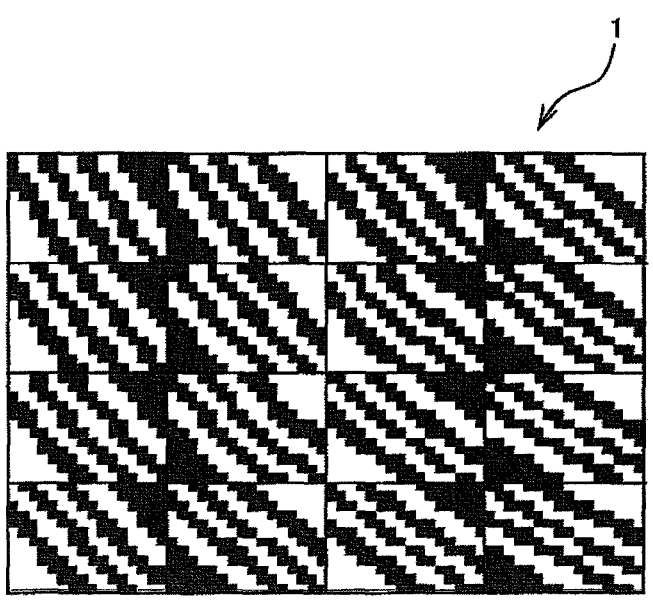
FIG. 30 is a pattern diagram showing a first example of grouping.
Figure 32:
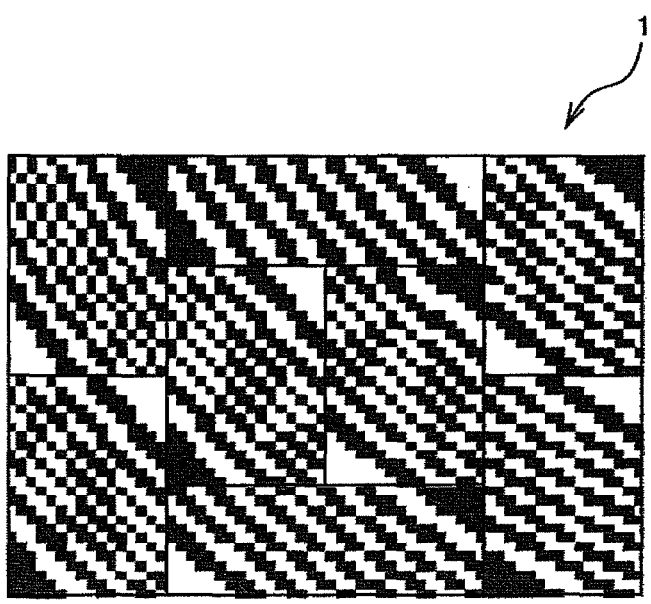
FIG. 32 is a pattern diagram showing a third example of grouping.

According to the ultrasound imaging apparatuses 100A and 100B of the present embodiment, the number of signal channels from electro-acoustic transducer elements of the two-dimensional array can be reduced, and by appropriate block division of the two-dimensional array as shown in FIG. 23 and appropriate grouping in each element block as shown in FIGS. 30, 32 according to the method shown in FIG. 28, simultaneous reception for imaging three-dimensional images at high speed with suppressing a grating lobe becomes possible. Therefore, real-time three-dimensional images of high quality can be obtained at low cost.

<Examples>

The grating lobe suppressing effect of the ultrasound imaging apparatus according to the present invention was confirmed by beam simulation.

A rectangular two-dimensional array having 3,072 square electro-acoustic transducer elements arranged in a matrix with 64 elements in the lateral axis direction and 48 elements in the elevational axis direction was used. The element pitch was 0.3 mm, and the size of the two-dimensional array was 19.2 mm in the lateral axis direction and 14.4 mm in the elevational axis direction.

As to the number of channels, 3,072 channels were reduced to 128 channels, and the scan-line direction was obliquely at 45 degrees relative to the center axis of the two-dimensional array ($\theta_j=\phi_j=45°$ in FIG. 33 described later), and the focal distance Fd for determining the grouping pattern was 50 mm. Transmit waves were pulse waves having a center frequency of 2.5 MHz, a band width of 1 MHz, and a pulse width of 2 μs.

Figure 29:
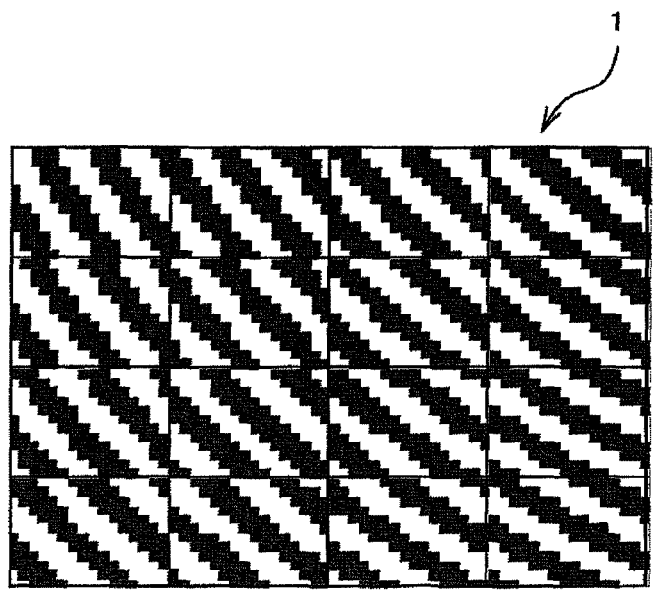
FIG. 29 is a pattern diagram showing a comparative example of grouping.

FIG. 29 is a pattern diagram showing a comparative example of grouping.

In this comparative example, first, the two-dimensional array 1 was divided into four parts in the elevational axis direction and into four parts in the lateral axis direction, and thus divided into 16 element blocks in a matrix, and eight channels were assigned to each element block. Then, each element block was divided into eight groups such that the differences in delay between them were the same as shown in FIG. 27, and the channels of the electro-acoustic transducer elements in each group were made to converge so as to assign one channel to the group so that the number of channels of the two-dimensional array 1 became 128.

FIG. 30 is a pattern diagram showing a first example of grouping.

In the first example, first, the two-dimensional array 1 was divided into 16 element blocks as in the comparative example, and eight channels were assigned to each element block. Then, each element block was divided into eight groups such that the integral of the occurrence frequency of the delay was the same for them as shown in FIG. 28, and the channels of the electro-acoustic transducer elements in each group were made to converge so as to assign one channel to the group so that the number of channels of the two-dimensional array 1 became 128.

Figure 31:
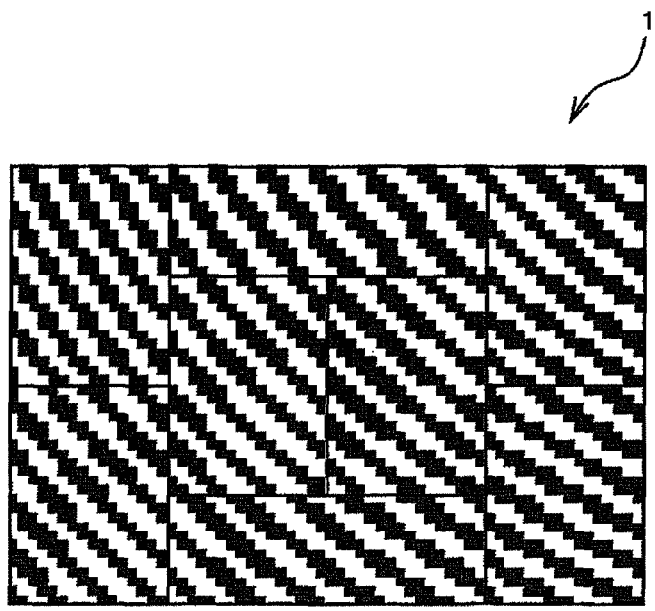
FIG. 31 is a pattern diagram showing a second example of grouping.

FIG. 31 is a pattern diagram showing a second example of grouping.

In the second example, first, the two-dimensional array 1 was divided into eight element blocks such that, as shown in FIG. 23, there are mixed element blocks of which the size in the elevational axis direction is larger than the size in the lateral axis direction and element blocks of which the size in the lateral axis direction is larger than the size in the elevational axis direction, and 16 channels were assigned to each element block. Then, each element block was divided into 16 groups such that the differences in delay between them were the same as shown in FIG. 27, and the channels of the electro-acoustic transducer elements in each group were made to converge so as to assign one channel to the group so that the number of channels of the two-dimensional array 1 became 128.

FIG. 32 is a pattern diagram showing a third example of grouping.

In the third example, first, the two-dimensional array 1 was divided into eight element blocks like in the second example. Then, each element block was divided into 16 groups such that the integral of the occurrence frequency of the delay was the same for them as shown in FIG. 28, and the channels of the electro-acoustic transducer elements in each group were made to converge so as to assign one channel to the group so that the number of channels of the two-dimensional array 1 became 128.

For each of the grouping patterns of the comparative example and the first to third examples, a hemispheric receive beam profile with the focal distance of 50 mm as the radius was calculated. The effective value of sound pressure per unit pulse width was obtained as the level of the beam.

Figure 33:
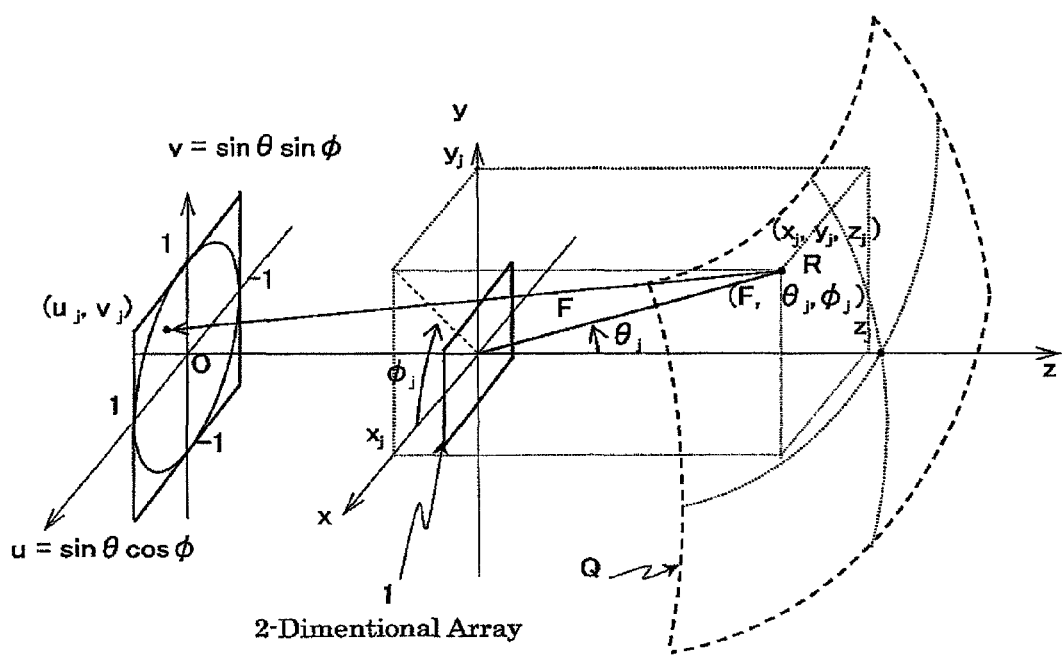
FIG. 33 illustrates a display coordinate system for a beam profile.

FIG. 33 illustrates a display coordinate system for the beam profile.

The two-dimensional array 1 is placed in the xy plane of an orthogonal coordinate system (x, y, z) where the z axis is the center axis, and the beam pattern on a hemisphere Q with the radius equal to the focal distance F and the point where x=y=z=0 being the center is projected onto a coordinate system (u, v) into which the (x, y) coordinate system is normalizing with the focal distance F. The coordinates ($x_j$, $y_j$, $z_j$) of the focal point R on the hemisphere Q can be expressed by a coordinate system (F, $\theta_j$, $\phi_j$) where F is the focal distance, $\theta_j$ is the rotation angle relative to the z axis, and $\phi_j$ is the rotation angle relative to the x axis. The conversion to the (u, v) coordinate system of the focal point R can be expressed as $u_j=\sin\theta_j \sin\phi_j$, $v_j=\sin\theta_j \cos\phi_j$. The position in the (u, v) coordinate system corresponding to the scan-line direction deflected obliquely at 45° ($\theta_j=\phi_j=45°$) relative to the front direction previously mentioned is expressed as u=v=0.5.

Figure 34:
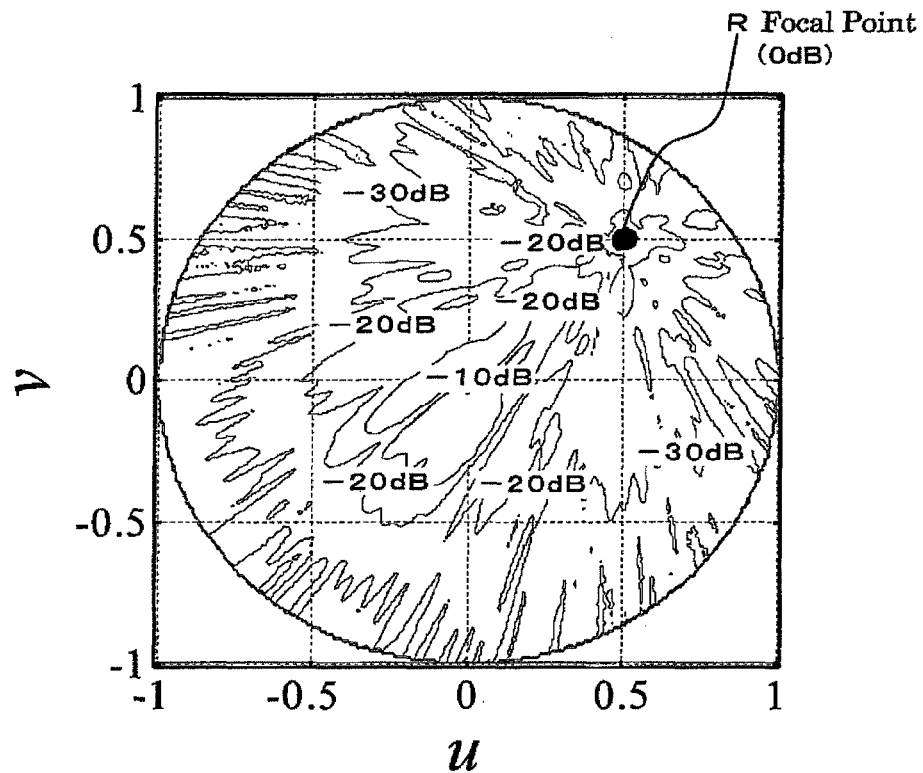
FIG. 34 is a contour line diagram showing the beam profile in a (u, v) coordinate system for the grouping pattern of the comparative example.

FIG. 34 is a contour line diagram showing the beam profile in the (u, v) coordinate system for the grouping pattern of the comparative example.

It is seen that when using the grouping pattern of the comparative example, a large grating lobe of the same level as at the focal point R occurs in the front direction.

Figure 35:
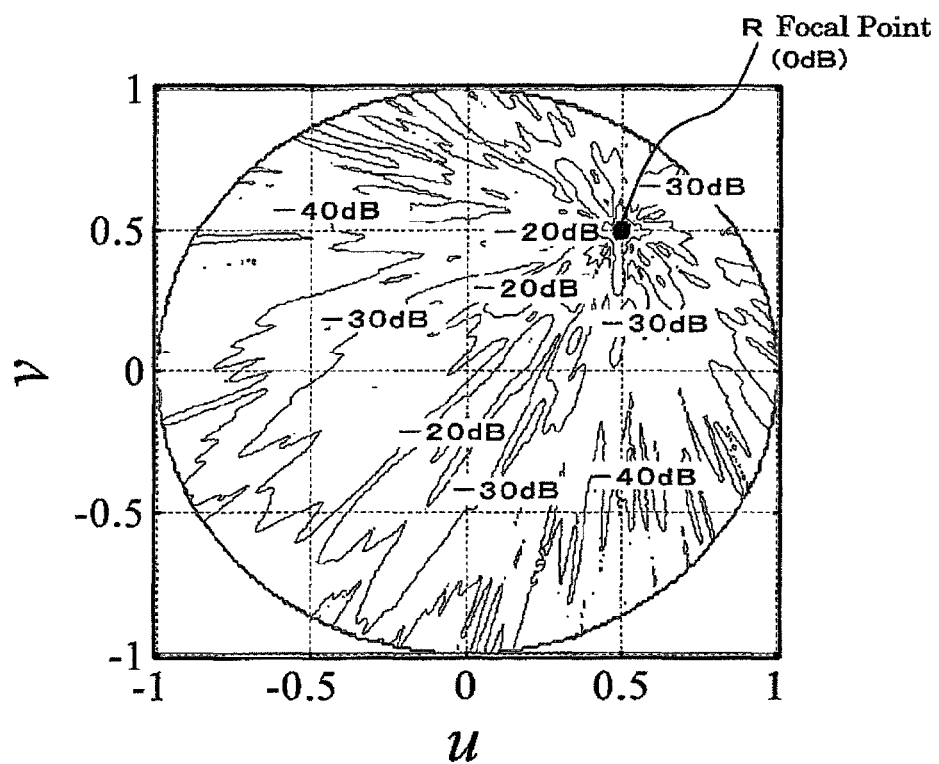
FIG. 35 is a contour line diagram showing the beam profile in the (u, v) coordinate system for the grouping pattern of the first example.

FIG. 35 is a contour line diagram showing the beam profile in the (u, v) coordinate system for the grouping pattern of the first example.

It is seen that when using the grouping pattern of the first example, a grating lobe is suppressed as compared with the comparative example, because of grouping such that the integral of the occurrence frequency of the delay in the histogram is the same.

Figure 36:
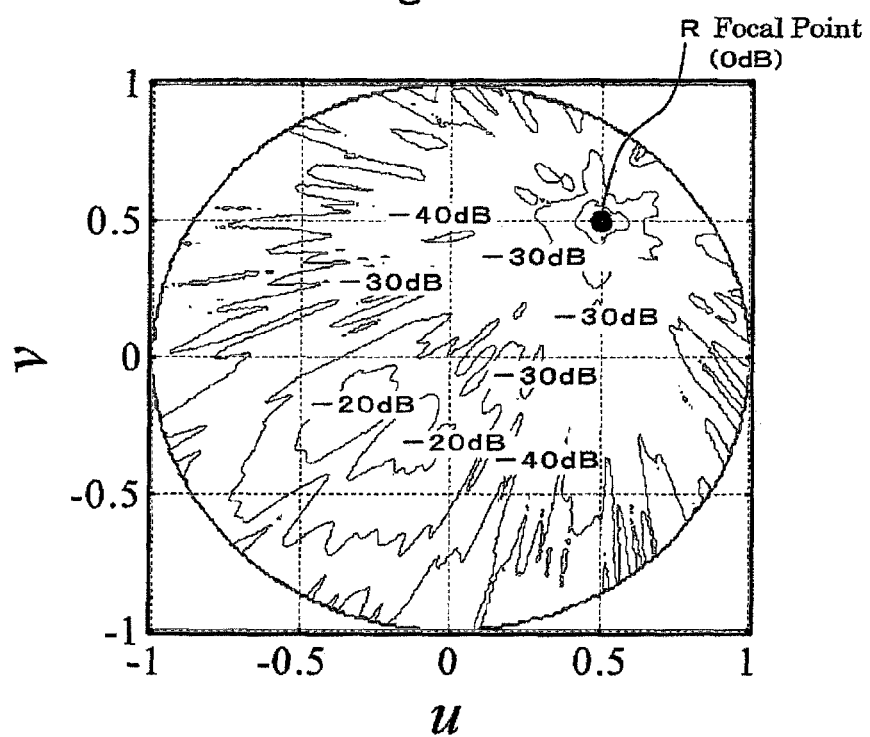
FIG. 36 is a contour line diagram showing the beam profile in the (u, v) coordinate system for the grouping pattern of the second example.

FIG. 36 is a contour line diagram showing the beam profile in the (u, v) coordinate system for the grouping pattern of the second example.

It proves that when using the grouping pattern of the second example, a grating lobe is suppressed as compared with the comparative example, because of grouping such that there are mixed element blocks of which the size in the elevational axis direction is larger than the size in the lateral axis direction and element blocks of which the size in the lateral axis direction is larger than the size in the elevational axis direction.

Figure 37:
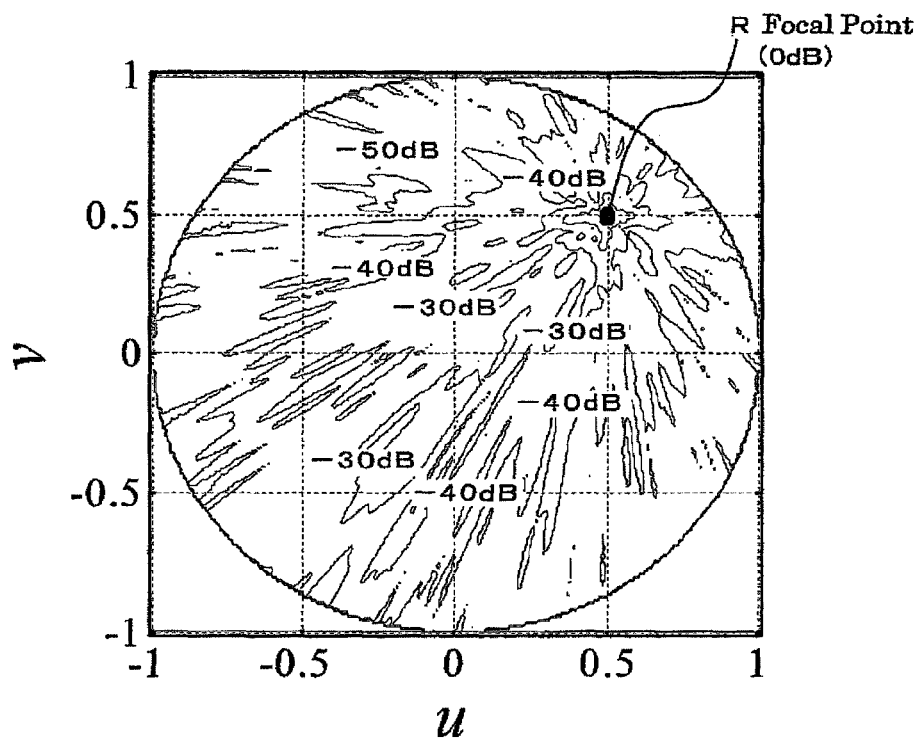
FIG. 37 is a contour line diagram showing the beam profile in the (u, v) coordinate system for the grouping pattern of the third example.

FIG. 37 is a contour line diagram showing the beam profile in the (u, v) coordinate system for the grouping pattern of the third example.

It proves that when using the grouping pattern of the third example, a grating lobe is further suppressed as compared with the first and second examples, because of grouping such that the integral of the occurrence frequency of the delay in the histogram is the same, as well as that there are mixed element blocks of which the size in the elevational axis direction is larger than the size in the lateral axis direction and element blocks of which the size in the lateral axis direction is larger than the size in the elevational axis direction.

According to these simulation results, the following effects were confirmed.

(1) By grouping such that there are mixed element blocks of which the size in the elevational axis direction is larger than the size in the lateral axis direction and element blocks of which the size in the lateral axis direction is larger than the size in the elevational axis direction, a grating lobe can be suppressed.

(2) By grouping such that the integral of the occurrence frequency of the delay in the histogram is the same, a grating lobe can be suppressed.

(3) By using both the (1) and (2), the grating lobe suppressing effect can be further increased.

What is claimed is:

1. An ultrasound imaging apparatus comprising a two-dimensional array which consists of a plurality of transducer elements distributed two-dimensionally and transmits and receives ultrasonic waves while scanning an area to be imaged to create an ultrasound three-dimensional image, wherein the transducer elements are divided into a plurality of element blocks including a first element block of which a size in a second direction of an arrangement surface of the two-dimensional array is larger than a size in a first direction of the surface, and a second element block of which a size in the first direction is larger than a size in the second direction, and each of the element blocks is divided into a predetermined number of groups so as to form a transmit beam and a plurality of receive beams in the area to be imaged, the ultrasound imaging apparatus further comprising a selecting means for making transmit/receive channels of the transducer elements grouped to be one channel in each of the groups.

2. The ultrasound imaging apparatus according to claim 1, wherein the element blocks are rectangular.

3. The ultrasound imaging apparatus according to claim 1, wherein the element blocks are arranged symmetric with respect to the first direction and the second direction.

4. The ultrasound imaging apparatus according to claim 1, wherein the selecting means changes a pattern of the groups between when forming the transmit beam and when forming the receive beams.

5. The ultrasound imaging apparatus according to claim 1, wherein the size in the first direction of the first element block is equal to or smaller than the product of the number of channels per element block and an element pitch of the two-dimensional array, and the size in the second direction of the second element block is equal to or smaller than the product of the number of channels per element block and the element pitch of the two-dimensional array.

6. The ultrasound imaging apparatus according to claim 1, wherein the selecting means divides each of the element blocks into the predetermined number of the groups such that the integral of occurrence frequency of a delay to be given to the transducer element over a range of the delay for each of the groups is the same.

* * * * *